US012394364B2

(12) United States Patent
Shin et al.

(10) Patent No.: US 12,394,364 B2
(45) Date of Patent: Aug. 19, 2025

(54) GATE DRIVING CIRCUIT AND DISPLAY DEVICE INCLUDING THE SAME

(71) Applicant: LG Display Co., Ltd., Seoul (KR)

(72) Inventors: Yeon Woo Shin, Paju-si (KR); Jae Sung Yu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/516,836

(22) Filed: Nov. 21, 2023

(65) Prior Publication Data

US 2024/0221624 A1 Jul. 4, 2024

(30) Foreign Application Priority Data

Dec. 29, 2022 (KR) ........................ 10-2022-0189823

(51) Int. Cl.
*G09G 3/32* (2016.01)

(52) U.S. Cl.
CPC ....... *G09G 3/32* (2013.01); *G09G 2300/0426* (2013.01); *G09G 2300/0852* (2013.01); *G09G 2310/0267* (2013.01); *G09G 2310/0286* (2013.01)

(58) Field of Classification Search
CPC ............... G09G 3/3266; G09G 3/3233; G09G 2310/08; G09G 2300/0426; G09G 2310/0267; G09G 2310/0286; G09G 2300/0861; G09G 2300/0842
See application file for complete search history.

(56) References Cited

U.S. PATENT DOCUMENTS

| | | | | | |
|---|---|---|---|---|---|
| 10,297,331 | B2 * | 5/2019 | Miyake | G11C 19/28 | |
| 2008/0246697 | A1 * | 10/2008 | Kim | G09G 3/3233 | 345/76 |
| 2011/0102409 | A1 * | 5/2011 | Hayakawa | G09G 3/3674 | 345/212 |
| 2013/0235026 | A1 * | 9/2013 | Yamamoto | G11C 19/184 | 345/100 |
| 2015/0269879 | A1 * | 9/2015 | Shang | G09G 3/20 | 345/215 |
| 2015/0317954 | A1 * | 11/2015 | Jang | G09G 3/3677 | 345/82 |
| 2016/0042806 | A1 * | 2/2016 | Ogawa | G11C 19/28 | 377/64 |
| 2016/0322116 | A1 * | 11/2016 | Jang | G11C 19/28 | |
| 2017/0032733 | A1 * | 2/2017 | Jang | G09G 3/20 | |
| 2019/0088190 | A1 * | 3/2019 | Zhang | G09G 3/20 | |
| 2019/0164498 | A1 * | 5/2019 | Jang | G09G 3/3266 | |

(Continued)

*Primary Examiner* — Shaheda A Abdin
(74) *Attorney, Agent, or Firm* — Seed IP Law Group LLP

(57) ABSTRACT

Provided are a gate driver and a display device including the same. The display device may include a display panel configured to display an image, a data driver configured to supply a data voltage to the display panel, a gate driver including a scan signal generation circuit configured to supply a scan signal to the display panel and a light-emitting signal generation circuit configured to supply a light-emitting signal to the display panel, and a clear signal line connected to the gate driver to deliver a clear signal in an alternating current form including a positive voltage and a negative voltage, wherein the gate driver initializes at least one of nodes of the scan signal generation circuit and nodes of the light-emitting signal generation circuit based on the clear signal.

18 Claims, 16 Drawing Sheets

(56) References Cited

U.S. PATENT DOCUMENTS

| | | | | |
|---|---|---|---|---|
| 2019/0172843 | A1* | 6/2019 | Yoshida | H01L 29/78648 |
| 2021/0118370 | A1* | 4/2021 | Shim | G09G 3/3666 |
| 2021/0280121 | A1* | 9/2021 | Nam | G09G 3/3685 |
| 2023/0377523 | A1* | 11/2023 | In | G09G 3/3233 |

* cited by examiner

GATE DRIVING CIRCUIT AND DISPLAY DEVICE INCLUDING THE SAME

CROSS-REFERENCE TO RELATED APPLICATION

This application claims the benefit of Korean Patent Application No. 10-2022-0189823, filed on Dec. 29, 2022, which is hereby incorporated by reference as if fully set forth herein.

BACKGROUND

Technical Field

The present disclosure relates to a gate driving circuit and a display device including the same.

Description of the Related Art

With the development of information technology, the market for display devices that are media for connection between users and information is growing. Accordingly, display devices such as an LED, a quantum dot display (QDD), and a liquid crystal display (LCD) have been increasingly used.

The above display devices each include a display panel including sub-pixels, a driver which outputs a driving signal for driving of the display panel, and a power supply which generates power to be supplied to the display panel or the driver.

In such a display device, when sub-pixels formed in a display panel are supplied with driving signals, for example, a scan signal and a data signal, a selected one thereof may transmit light therethrough or may directly emit light, thereby displaying an image.

BRIEF SUMMARY

Accordingly, the present disclosure is directed to a gate driving circuit and a display device including the same that substantially obviate one or more problems due to limitations and disadvantages of the related art.

A technical feature of the present disclosure is to provide a gate driving circuit including a clear signal line for delivering a clear signal and a display device including the same. For example, driving reliability and driving stability as well as a lifespan of a display device may be improved based on a circuit capable of simultaneously removing and initializing residual charges that are different for each stage and for each node of a signal generation circuit. In addition, another benefit of the present disclosure is to minimize or reduce generation of leakage current when driving a device.

Additional advantages, benefits, and features of the disclosure will be set forth in part in the description which follows and in part will become apparent to those having ordinary skill in the art upon examination of the following or may be learned from practice of the disclosure. The benefits and other advantages of the disclosure may be realized and attained by the structure particularly pointed out in the written description and claims hereof as well as the appended drawings.

To achieve these benefits and other advantages and in accordance with the purpose of the disclosure, as embodied and broadly described herein, a display device includes a display panel configured to display an image, a data driver configured to supply a data voltage to the display panel, a gate driver including a scan signal generation circuit configured to supply a scan signal to the display panel and a light-emitting signal generation circuit configured to supply a light-emitting signal to the display panel, and a clear signal line connected to the gate driver to deliver a clear signal in an alternating current form including a positive voltage and a negative voltage, wherein the gate driver initializes at least one of nodes of the scan signal generation circuit and nodes of the light-emitting signal generation circuit based on the clear signal.

For example, the nodes of the scan signal generation circuit may include a node Q (for example, a node Q1 in FIG. 9) and a node Qb (for example, a node Qb1 in FIG. 9) for controlling output of the scan signal, and the nodes of the light-emitting signal generation circuit may include a node Q (for example, a node Q2 in FIG. 18) and a node Qb (for example, a node Qb2 in FIG. 18) for controlling output of the light-emitting signal.

A negative voltage level of the clear signal may be varied at least every frame.

The gate driver may perform initialization based on the clear signal upon beginning of driving before the start signal is applied from outside.

The clear signal line may be included in at least one of the scan signal generation circuit or the light-emitting signal generation circuit, and be connected to a back gate electrode included in each of a transistor for controlling a node and a transistor for generating output in response to a potential of the node.

A negative voltage level of the clear signal may be lower than a negative voltage level applied to respective source electrodes of the transistors.

The clear signal line may include a first clear signal line connected to a back gate electrode included in each of a transistor for controlling a node, a transistor for controlling a scan signal output terminal that outputs a scan signal, and a transistor for controlling a scan carry signal output terminal that outputs a scan carry signal in the scan signal generation circuit, and a second clear signal line connected to a back gate electrode included in each of a transistor for controlling a node, a transistor for controlling a light-emitting signal output terminal that outputs a light-emitting signal, and a transistor for controlling a light-emitting carry signal output terminal that outputs a light-emitting carry signal in the light-emitting signal generation circuit.

The clear signal may include a first clear signal applied through the first clear signal line and a second clear signal applied through the second clear signal line, and a voltage level of the first clear signal and a voltage level of the second clear signal may be the same during a first time and different during a second time.

The gate driver may be initialized simultaneously in all stages thereof, each of the stages including the scan signal generation circuit and the light-emitting signal generation circuit.

In another aspect of the present disclosure, a gate driving circuit includes a scan signal generation circuit including a scan node control circuit for alternately controlling a node Q1 and a node Qb1, a scan signal output circuit for outputting a scan signal in response to potentials of the node Q1 and the node Qb1, and a scan carry signal output for outputting a scan carry signal in response to the potentials of the node Q1 and the node Qb1, a light-emitting signal generation circuit including a light-emitting node control circuit for alternately controlling a node Q2 and a node Qb2. a light-emitting signal output circuit for outputting a light-emitting signal in response to potentials of the node Q2 and the node Qb2, and a light-emitting carry signal output for outputting a light-emitting carry signal in response to the potentials of the node Q2 and the node Qb2, and a clear signal line configured to deliver a clear signal in an alternating current form including a positive voltage and a negative voltage, wherein at least one of the scan signal generation circuit and the light-emitting signal generation circuit is initialized based on the clear signal upon beginning of driving before a start signal is applied from outside.

A negative voltage level of the clear signal may be varied at least every frame.

The clear signal line may be included in the at least one of the scan signal generation circuit and the light-emitting signal generation circuit, and may be connected to a back gate electrode included in each of a transistor for controlling a node and a transistor for generating output in response to a potential of the node.

A negative voltage level of the clear signal may be lower than a negative voltage level applied to respective source electrodes of the transistors.

It is to be understood that both the foregoing general description and the following detailed description of the present disclosure are examples and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

A display device according to embodiments may be implemented as a television, a video player, a personal computer (PC), a home theater, an automotive electric device, or a smartphone, but is not limited thereto. The display device according to the present disclosure may be implemented as an LED, a QDD, or an LCD. For convenience of description, an LED device that directly emits light based on an inorganic light-emitting diode or an organic light-emitting diode will hereinafter be taken as an example of the display device according to the present disclosure.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole may flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron may flow from the source to the drain. In the n-type TFT, an electron flows from the source to the drain side, and thus current flows from the drain to the source side. However, the source and the drain of the TFT may be changed depending on the applied voltage. Reflecting this, in the following description, one of the source and drain will be described as a first electrode, and the other of the source and drain will be described as a second electrode.

Figure 1:
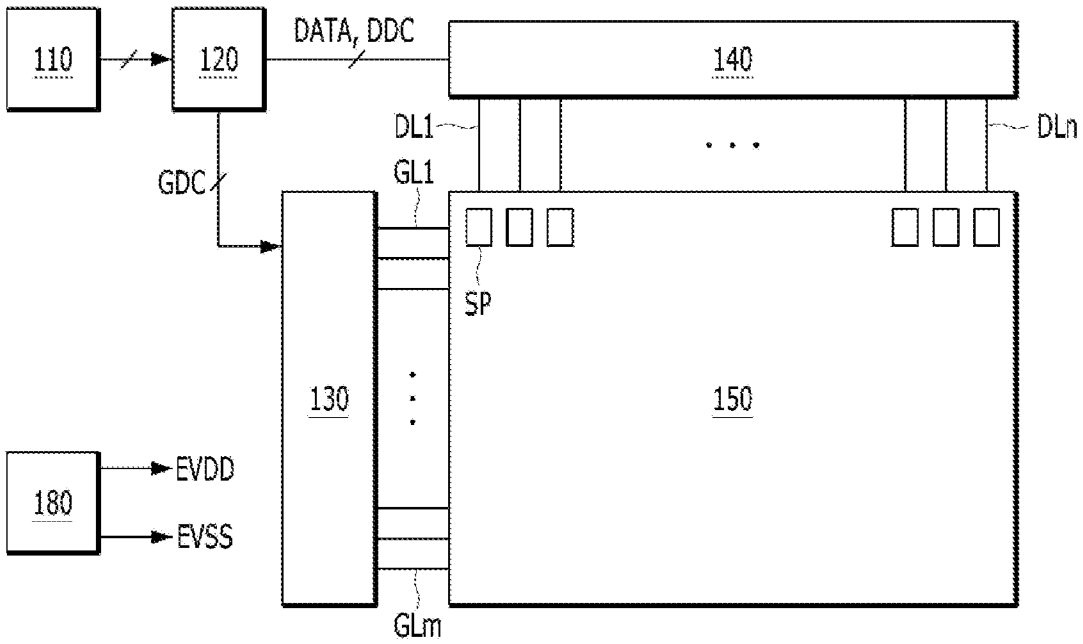
FIG. 1 is a block diagram schematically illustrating a light-emitting device (LED) device.
Figure 2:
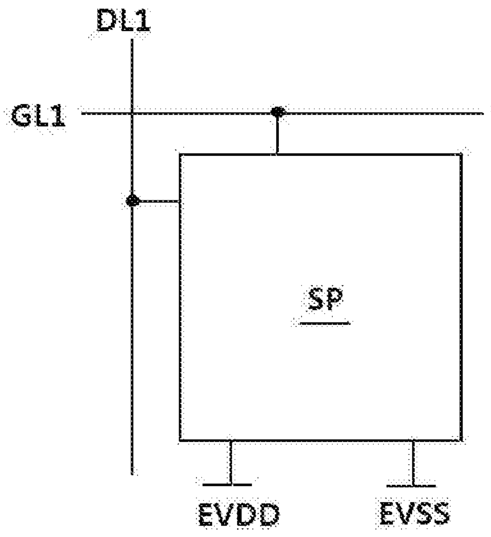
FIG. 2 is a block diagram schematically illustrating a sub-pixel illustrated in FIG. 1.

FIG. 1 is a block diagram schematically illustrating an LED device, and FIG. 2 is a block diagram schematically illustrating a sub-pixel illustrated in FIG. 1.

As illustrated in FIGS. 1 and 2, the LED device may include an image supply 110, a timing controller 120, a gate driver (gate driving circuit) 130, a data driver (data driving circuit) 140, a display panel 150, a power supply 180, etc.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC for control of operation timing of the gate driver 130, a data timing control signal DDC for control of operation timing of the data driver 140, and various synchronization signals (a vertical synchronization signal VSYNC and a horizontal synchronization signal HSYNC). The timing controller 120 may supply a data signal DATA supplied from the image supply 110 together with the data timing control signal DDC to the data driver 140. The timing controller 120 may take the form of an integrated circuit (IC) and be mounted on a printed circuit board, but is not limited thereto.

The gate driver 130 may output a gate signal (or gate voltage) in response to the gate timing control signal GDC supplied from the timing controller 120. The gate driver 130 may supply the gate signal to sub-pixels included in the display panel 150 through gate lines GL1 to GLm. The gate driver 130 may take the form of an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the sub-pixels included in the display panel 150 through data lines DL1 to DLn. The data driver 140 may take the form of an IC and be mounted on the display panel 150 or on the printed circuit board, but is not limited thereto.

The power supply 180 may generate a high-potential voltage and a low-potential voltage based on an external input voltage supplied from the outside and output the high-potential voltage and the low-potential voltage through a high-potential power line EVDD and a low-potential power line EVSS. The power supply 180 may generate and output not only the high-potential voltage and the low-potential voltage, but also a voltage beneficial for driving the gate driver 130 or a voltage beneficial for driving the data driver 140.

The display panel 150 may display an image in response to a gate signal, a driving signal including a data voltage, a driving voltage including a high-potential voltage and a low-potential voltage, etc. Sub-pixels of the display panel 150 directly emit light. The display panel 150 may be manufactured based on a rigid or flexible substrate of glass, silicon, polyimide, etc. In addition, pixels emitting light may include pixels including red, green, and blue sub-pixels or pixels including red, green, blue, and white sub-pixels.

For example, one sub-pixel SP may be connected to a first data line DL1, a first gate line GL1, a first power line EVDD, and a second power line EVSS, and may include a pixel circuit which is composed of a switching transistor, a driving transistor, a capacitor, an organic light-emitting diode, etc. The sub-pixel SP used in the LED device directly emits light, and thus a circuit configuration is complicated. In addition, there are various compensation circuits for compensating for deterioration of an organic light-emitting diode that emits light as well as a driving transistor that supplies driving current beneficial to drive the organic light-emitting diode. Accordingly, note that the sub-pixel SP is simply illustrated in the form of a block.

Meanwhile, the timing controller 120, the gate driver 130, the data driver 140, etc., have been described as having individual configurations. However, one or more of the timing controller 120, the gate driver 130, and the data driver 140 may be integrated into one IC depending on the implementation scheme of the LED device.

Figure 3:
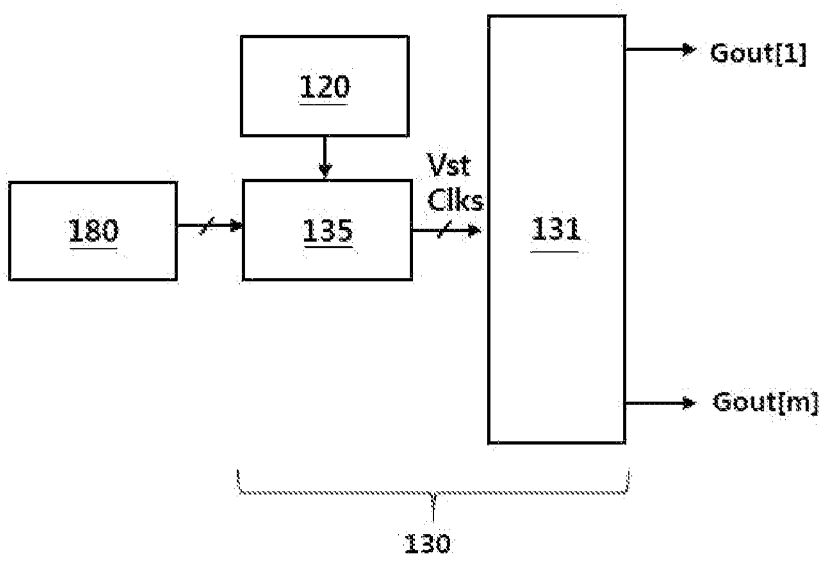
FIGS. 3 and 4 are diagrams for describing a configuration of a gate-in-panel (GIP)-type gate driver.
Figure 4:
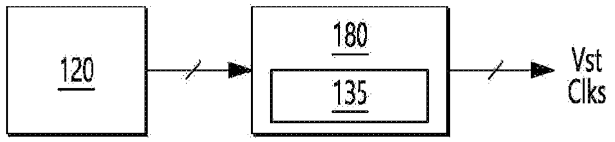
Figure 5:
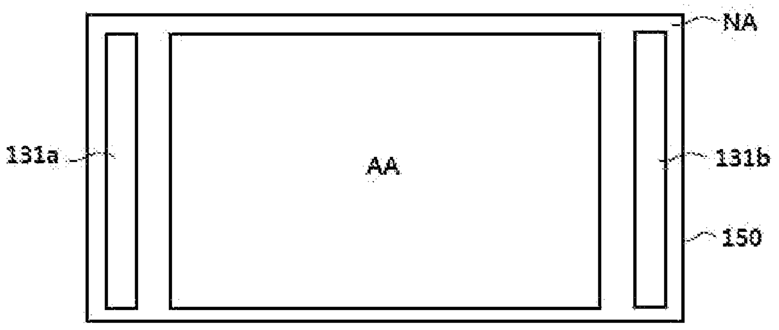
FIG. 5 is a diagram illustrating a layout example of the GIP-type gate driver.

FIGS. 3 and 4 are diagrams for describing a configuration of a GIP-type gate driver, and FIG. 5 is a diagram illustrating a layout example of the GIP-type gate driver.

As illustrated in FIG. 3, the GIP-type gate driver 130 may include a shift register 131 and a level shifter 135. The level shifter 135 may generate clock signals Clks, a start signal Vst, etc. based on signals and voltages output from the timing controller 120 and the power supply 180. The shift register 131 may operate based on the clock signals Clks, the start signal Vst, etc. output from the level shifter 135, and output gate signals Gout[1] to Gout[m].

As illustrated in FIGS. 3 and 4, unlike the shift register 131, the level shifter 135 may independently take the form of an IC or may be included in the power supply 180. However, this is merely one example, and the level shifter 135 is not limited thereto.

As illustrated in FIG. 5, in the GIP-type scan driver, shift registers 131*a* and 131*b* for outputting gate signals may be disposed in a non-display area NA of the display panel 150. The first and second shift registers 131*a* and 131*b* may take a form of a thin film on the display panel 150 using a GIP scheme. The first and second shift registers 131*a* and 131*b* are illustrated as being disposed in non-display areas NA on left and right sides of the display panel 150, respectively, as an example. However, the present disclosure is not limited thereto.

Figure 6:
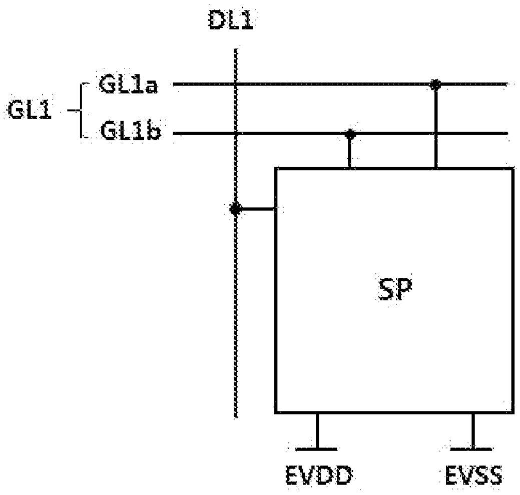
FIG. 6 is a block diagram schematically illustrating a sub-pixel according to a first embodiment.
Figure 7:
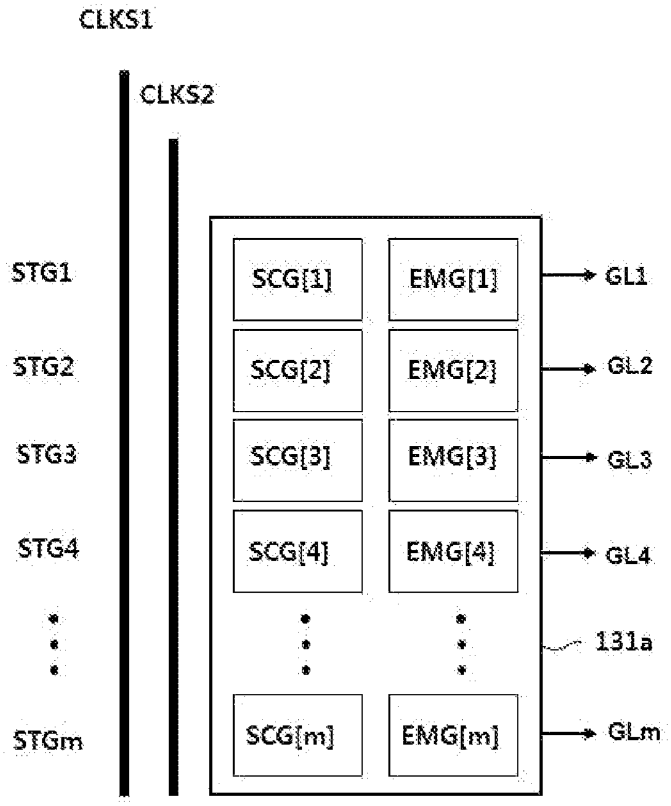
FIG. 7 is a block diagram schematically illustrating a shift register according to the first embodiment.
Figure 8:
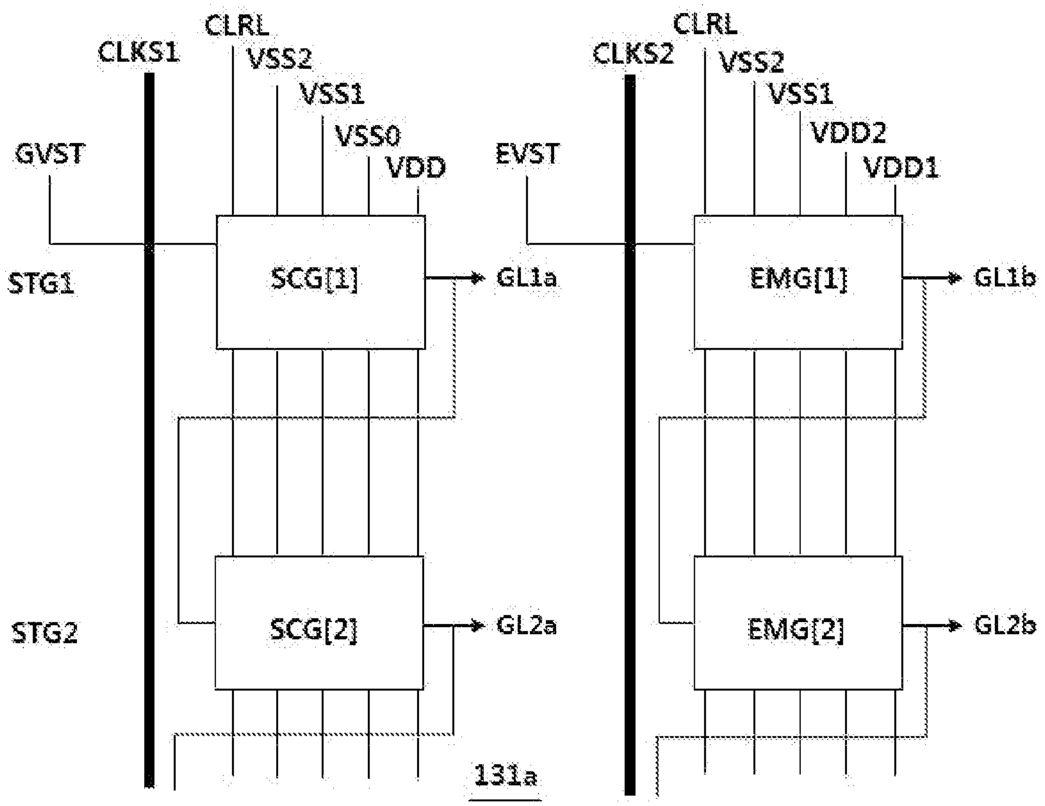
FIG. 8 is a block diagram illustrating a part of the shift register illustrated in FIG. 7.

FIG. 6 is a block diagram schematically illustrating a sub-pixel according to a first embodiment, FIG. 7 is a block diagram schematically illustrating a shift register according to the first embodiment, and FIG. 8 is a block diagram illustrating a part of the shift register illustrated in FIG. 7.

As illustrated in FIG. 6, the sub-pixel SP according to the first embodiment may be connected to a first gate line GL1, a first data line DL1, a high-potential power line EVDD, and a low-potential power line EVSS. The first gate line GL1 may include a scan signal line GL1*a* and a light-emitting signal line GL1*b*. The scan signal line GL1*a* and the light-emitting signal line GL1*b* may be disposed on the same horizontal line. The sub-pixel according to the first embodiment may operate based on a scan signal applied through the scan signal line GL1*a*, a light-emitting signal applied through the light-emitting signal line GL1*b*, etc.

As illustrated in FIG. 7, the shift register 131*a* according to the first embodiment may include scan signal generation units (circuits) SCG[1] to SCG[m] that output scan signals and light-emitting signal generation units (circuits) EMG[1] to EMG[m] that output light-emitting signals to drive a display panel including the sub-pixels illustrated in FIG. 6. Throughout the description, reference may be made to "units." It should be understood that "unit" includes the meaning of a circuit or structure, as appropriate. A unit that is a circuit may include one or more circuit hardware elements, such as transistors, capacitors, resistors, inductors, diodes, and the like, which may be discrete or integrated.

The shift register 131*a* may include subordinately connected stages STG1 to STGm to sequentially output scan signals and light-emitting signals through the gate lines GL1 to GLm, which are as follows.

As illustrated in FIG. 8, the scan signal generation units SCG[1] to SCG[m] may be connected to first clock signal lines CLKS1, a first high-voltage line VDD, a first low-voltage line VSS0, a second low-voltage line VSS1, a third low-voltage line VSS2, and a first start signal line GVST. The scan signal generation units SCG[1] to SCG[m] may operate based on various signals, voltages, etc., applied through the first clock signal lines CLKS1, the first high-voltage line VDD, the first low-voltage line VSS0, the second low-voltage line VSS1, the third low-voltage line VSS2, and the first start signal line GVST.

The light-emitting signal generation units EMG[1] to EMG[m] may be connected to second clock signal lines CLKS2, a second high-voltage line VDD1, a third high-voltage line VDD2, a second low-voltage line VSS1, a third low-voltage line VSS2, and a second start signal line EVST. The light-emitting signal generation units EMG[1] to EMG [m] may operate based on various signals, voltages, etc., applied through the second clock signal lines CLKS2, the second high-voltage line VDD1, the third high-voltage line VDD2, the second low-voltage line VSS1, the third low-voltage line VSS2, and the second start signal line EVST.

High voltages applied through high-voltage lines connected to the scan signal generation units SCG[1] to SCG [m] and the light-emitting signal generation units EMG[1] to EMG[m] may have the same level, or one or more of the high voltages may be different according to a purpose and effect. In addition, low voltages applied through low-voltage lines connected to the scan signal generation units SCG[1] to SCG[m] and the light-emitting signal generation units EMG[1] to EMG[m] may have the same level, or one or more of the low voltages may be different according to a purpose and effect.

The first scan signal generation unit (circuit) SCG[1] and the first light-emitting signal generation unit (circuit) EMG [1] may be located in a first stage STG1. The second scan signal generation unit or circuit SCG[2] and the second light-emitting signal generation unit or circuit EMG[2] may be located in a second stage STG2.

The first scan signal generation unit SCG[1] may output a first scan signal through the first scan signal line GL1*a*, and the first light-emitting signal generation unit EMG[1] may output a first light-emitting signal through the first light-emitting signal line GL1*b*. The second scan signal generation unit SCG[2] may output a second scan signal through the second scan signal line GL2*a*, and the second light-emitting signal generation unit EMG[2] may output a second light-emitting signal through the second light-emitting signal line GL2*b*.

At least one of the scan signal generation units SCG[1] and SCG[2] or the light-emitting signal generation units EMG[1] and EMG[2] may be connected to a clear signal line CLRL that delivers a clear signal. A circuit connected to the clear signal line CLRL among the scan signal generation units SCG[1] and SCG[2] and the light-emitting signal generation units EMG[1] and EMG[2] may simultaneously initialize at least one of nodes thereof based on the clear signal.

The above connection relationship may be applied to scan signal generation units and light-emitting signal generation units of all stages included in the shift register 131*a*. Hereinafter, the embodiment will be described in more detail using an example of an Nth scan signal generation unit or circuit and an Nth light-emitting signal generation unit or circuit located in an Nth stage.

Figure 9:
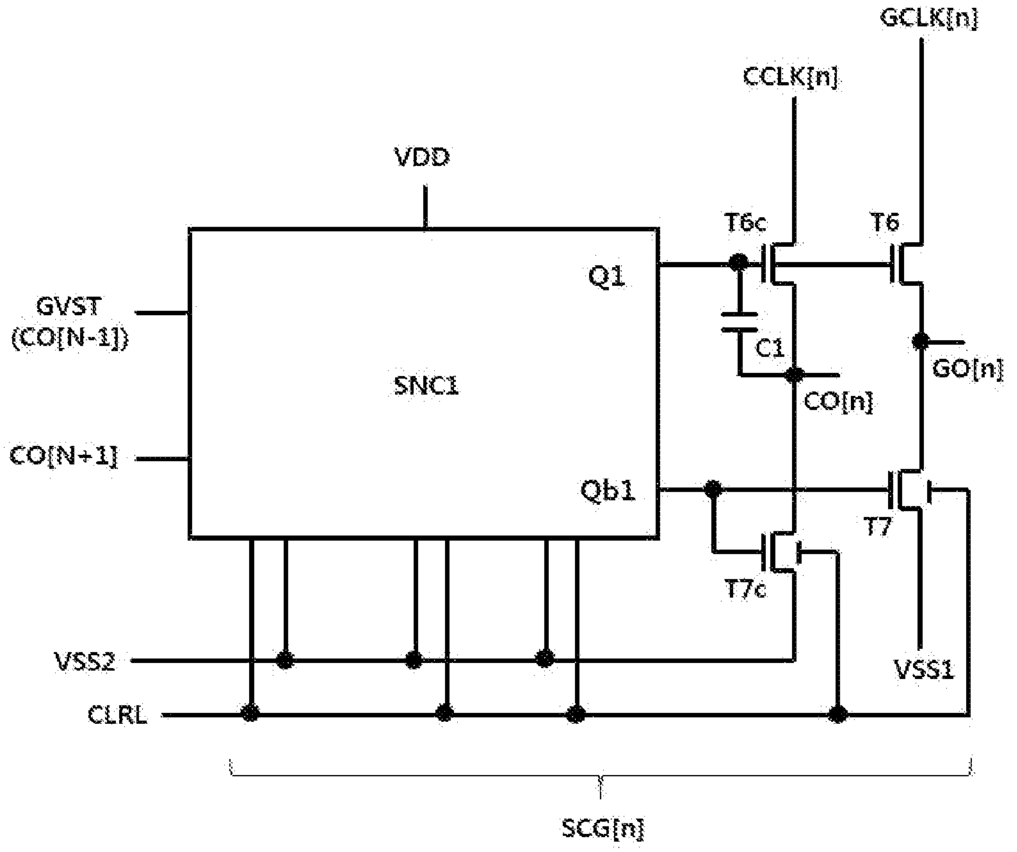
FIG. 9 is a circuit configuration diagram illustrating an Nth scan signal generation unit according to the first embodiment.
Figure 10:
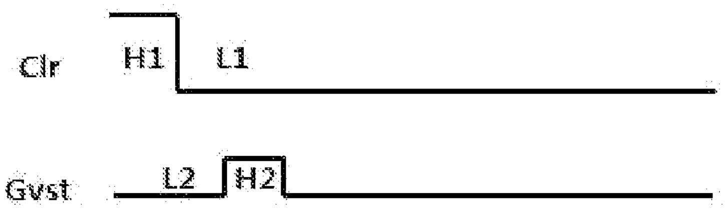
FIG. 10 is a diagram illustrating a part of a drive waveform of the Nth scan signal generation unit according to the first embodiment.
Figure 11:
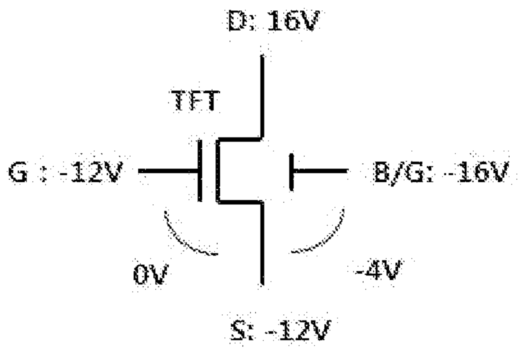
FIGS. 11 and 12 are drawings for describing advantages according to application of a clear signal.
Figure 12:
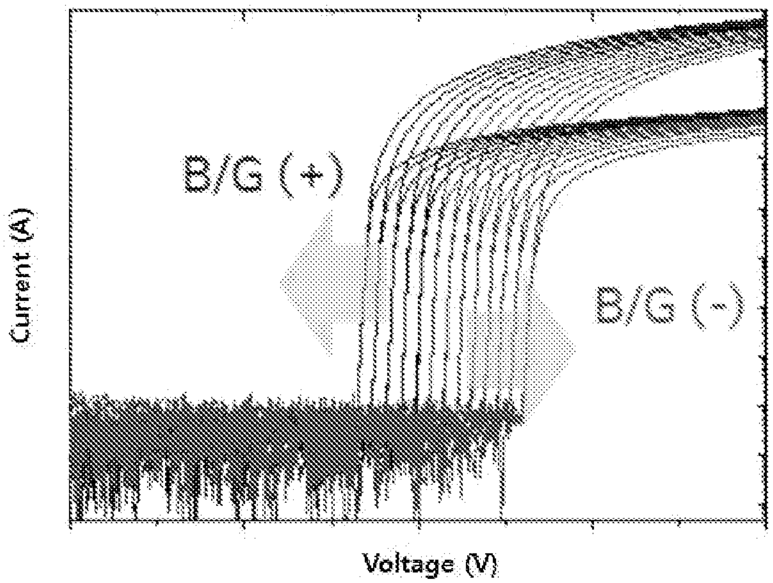

FIG. 9 is a circuit configuration diagram illustrating an Nth scan signal generation unit according to the first embodiment, FIG. 10 is a diagram illustrating a part of a drive waveform of the Nth scan signal generation unit according to the first embodiment, and FIGS. 11 and 12 are drawings for describing advantages according to application of a clear signal.

As illustrated in FIG. 9, an Nth scan signal generation unit SCG[n] may include a first scan node control circuit unit SNC1, first scan carry signal output units T6*c*, C1 and T7*c*, and first scan signal output units T6 and T7.

The first scan node control circuit unit SNC1 may operate based on various signals, voltages, etc., applied through the first high-voltage line VDD, the second low-voltage line VSS1, the third low-voltage line VSS2, and the first start signal line GVST, and control charging and discharging of a node Q1 and a node Qb1. The node Q1 and the node Qb1 of the first scan node control circuit unit SNC1 may be controlled by the first start signal applied through the first start signal line GVST and an (N+1)th scan carry signal output through an (N+1)th scan carry signal output terminal of an (N+1)th scan signal generation unit.

Meanwhile, FIG. 9 illustrates that the first start signal line GVST is connected to the Nth scan signal generation unit SCG[n] as an example. However, the first start signal line GVST may be applied to a scan signal generation unit located in the first stage, and each of scan signal generation units located in remaining stages may receive input of a scan carry signal of a previous stage as the first start signal.

The first scan signal output units T6 and T7 may include a 1-1th scan pull-up transistor T6 and a 1-1th scan pull-down transistor T7. The first scan signal output units T6 and T7 may output an Nth scan signal through an Nth scan signal output terminal GO[n] according to potentials of the node Q1 and the node Qb1 that operate alternately.

When the 1-1th scan pull-up transistor T6 is turned on by the potential of the node Q1, the Nth scan signal at a high voltage may be output based on an Nth scan clock signal applied through an Nth scan clock signal line GCLK[n]. When the 1-1th scan pull-down transistor T7 is turned on by the potential of the node Qb1, an Nth scan signal at a low voltage may be output based on a second low voltage applied through the second low-voltage line VSS1.

The first scan carry signal output units T6*c*, C1 and T7*c* may include a 1-2th scan pull-up transistor T6*c*, a first capacitor C1, and a 1-2th scan pull-down transistor T7*c*. The first scan carry signal output units T6*c*, C1 and T7*c* may output an Nth scan carry signal through an Nth scan carry signal output terminal CO[n] according to potentials of the node Q1 and the node Qb1 that operate alternately.

When the 1-2th scan pull-up transistor T6*c* is turned on by the potential of the node Q1, an Nth scan carry signal at a high voltage may be output based on an Nth carry clock signal applied through an Nth carry clock signal line CCLK [n]. When the 1-2th scan pull-down transistor T7*c* is turned on by the potential of the node Qb1, an Nth scan carry signal at a low voltage may be output based on a third low voltage applied through a third low-voltage line VSS2.

The 1-1th scan pull-down transistor T7 included in the first scan signal output units T6 and T7 and the 1-2th scan pull-down transistor T7*c* included in the first scan carry signal output units T6*c*, C1 and T7*c* may each include a back gate electrode. The back gate electrode may be an electrode located on the opposite side from a gate electrode located on a first surface with respect to a semiconductor layer and located on a back surface corresponding to a second surface with respect to the semiconductor layer with an insulating layer interposed therebetween.

The back gate electrode of the 1-1th scan pull-down transistor T7 and the back gate electrode of the 1-2th scan pull-down transistor T7*c* may be connected to the clear signal line CLRL that delivers the clear signal. In addition, at least one of transistors controlling the node Q1 and the node Qb1 of the first scan node control circuit unit SNC1 may include a back gate electrode, and may be connected to the clear signal line CLRL that delivers the clear signal.

As illustrated in FIGS. 9 and 10, the clear signal Clr delivered through the clear signal line CLRL may be generated as a first high voltage (H1, H1 being a positive voltage) upon beginning of driving prior to a first start signal Gvst delivered through the first start signal line GVST, and then may be maintained as a first low voltage (L1, L1 being a negative voltage).

When the clear signal Clr is applied upon beginning of driving prior to the first start signal Gvst, it is possible to initialize transistors that control the node Q1 and the node Qb1 of the 1-1th scan pull-down transistor T7, the 1-2th scan pull-down transistor T7*c*, and the first scan node control circuit unit SNC1 (node discharge). Since the scan signal generation units may attempt discharge of charges remaining inside due to the initialization operation of the nodes, driving stability and driving reliability may be improved.

Meanwhile, at least one of a first high voltage H1 or a first low voltage L1 constituting the clear signal Clr may have a different level compared to a second high voltage H2 and a second low voltage L2 constituting the first start signal Gvst. Hereinafter, a description will be given of an example in which a level of the first low voltage L1 constituting the clear signal Clr is a negative voltage level lower than a level of the second low voltage L2 constituting the first start signal Gvst.

As illustrated in FIG. 11, in the TFT, a voltage of −12 V may be applied to a gate electrode G, a voltage of 16 V may be applied to a drain electrode D, a voltage of −12 V may be applied to a source electrode S, and a voltage of −16 V may be applied to a back gate electrode B/G. In this case, a gate-source voltage difference becomes 0 V, and a back gate-source voltage difference may be −4 V.

In this way, when a negative voltage lower than a negative voltage applied to the source electrode S of the TFT is applied to the back gate electrode B/G, a threshold voltage Vth may be moved, and thus there is an effect of ensuring an off margin of a gate-source voltage Vgs, which can be seen by referring to a simulation result diagram related to movement of the threshold voltage according to voltages (+, −) applied to the back gate electrode B/G of FIG. 12.

In addition, when a negative voltage lower than a negative voltage applied to the source electrode S of the TFT is applied to the back gate electrode B/G, generation of leakage current may be minimized or reduced. When the TFT is implemented based on oxide, a satisfactory effect may be obtained.

In the first embodiment, in order to maximize or increase the effect of moving the threshold voltage Vth of the TFT based on the simulation result of FIG. 12, the clear signal Clr applied to the back gate electrode B/G may be configured in an alternating current form. Further, the negative voltage level constituting the clear signal Clr may be varied at least every frame.

Meanwhile, note that a scheme of configuring the clear signal Clr applied to the back gate electrode B/G in the alternating current form, and varying the clear signal Clr to maximize or increase the effect of moving the threshold voltage Vth of the TFT may be applied to various forms of scan signal generation units. Hereinafter, a second embodiment for aiding in understanding of the first embodiment will be described based on an example of a circuit included in the first scan node control circuit unit SNC1 of the Nth scan signal generation unit SCG[n].

Figure 13:
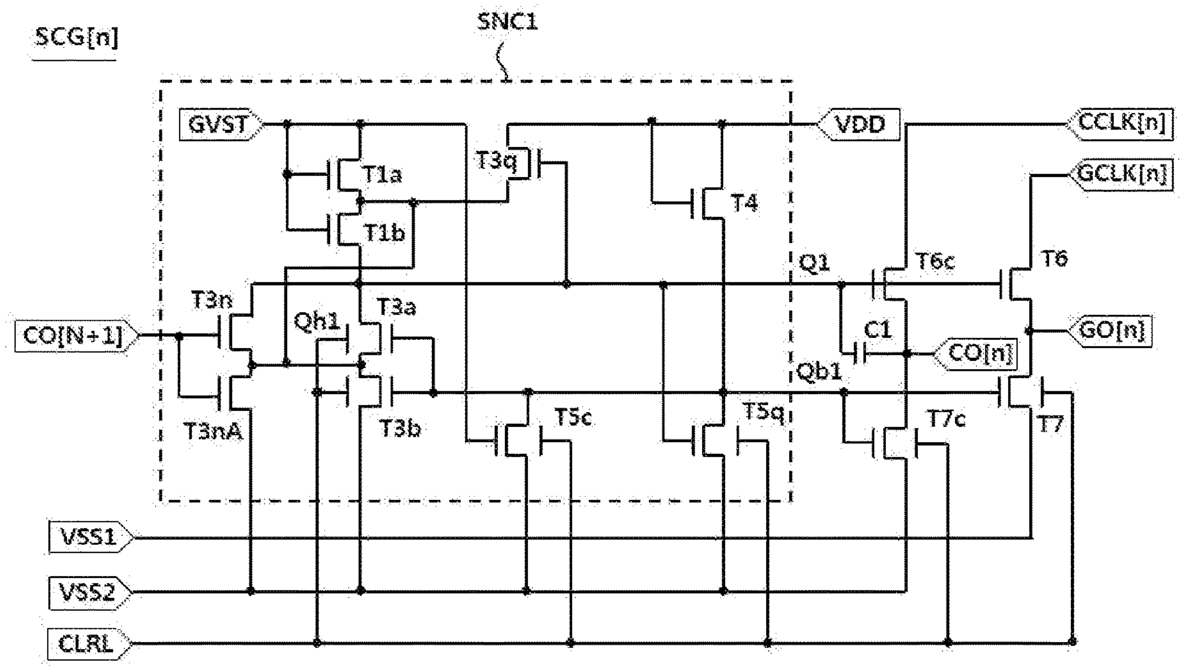
FIG. 13 is a circuit configuration diagram illustrating a circuit included in the Nth scan signal generation unit in more detail according to a second embodiment.
Figure 14:
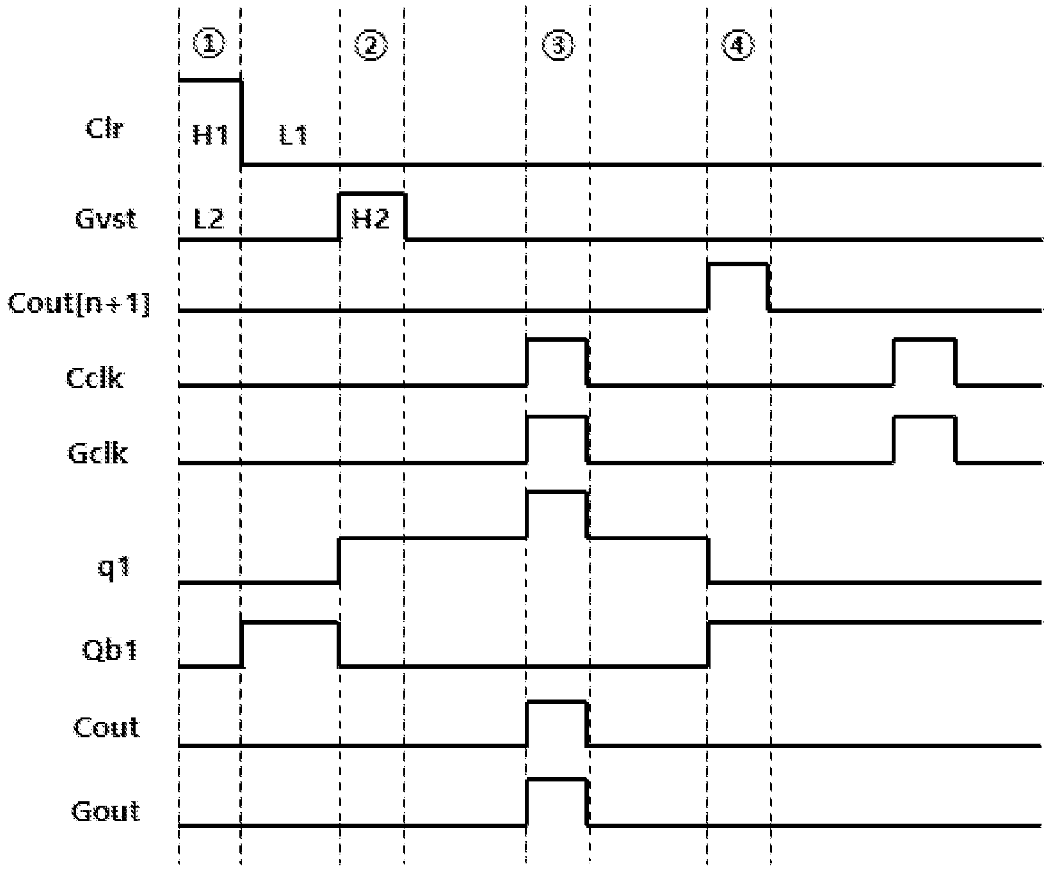
FIG. 14 is a waveform diagram for describing an operation of the Nth scan signal generation unit for each section.
Figure 15:
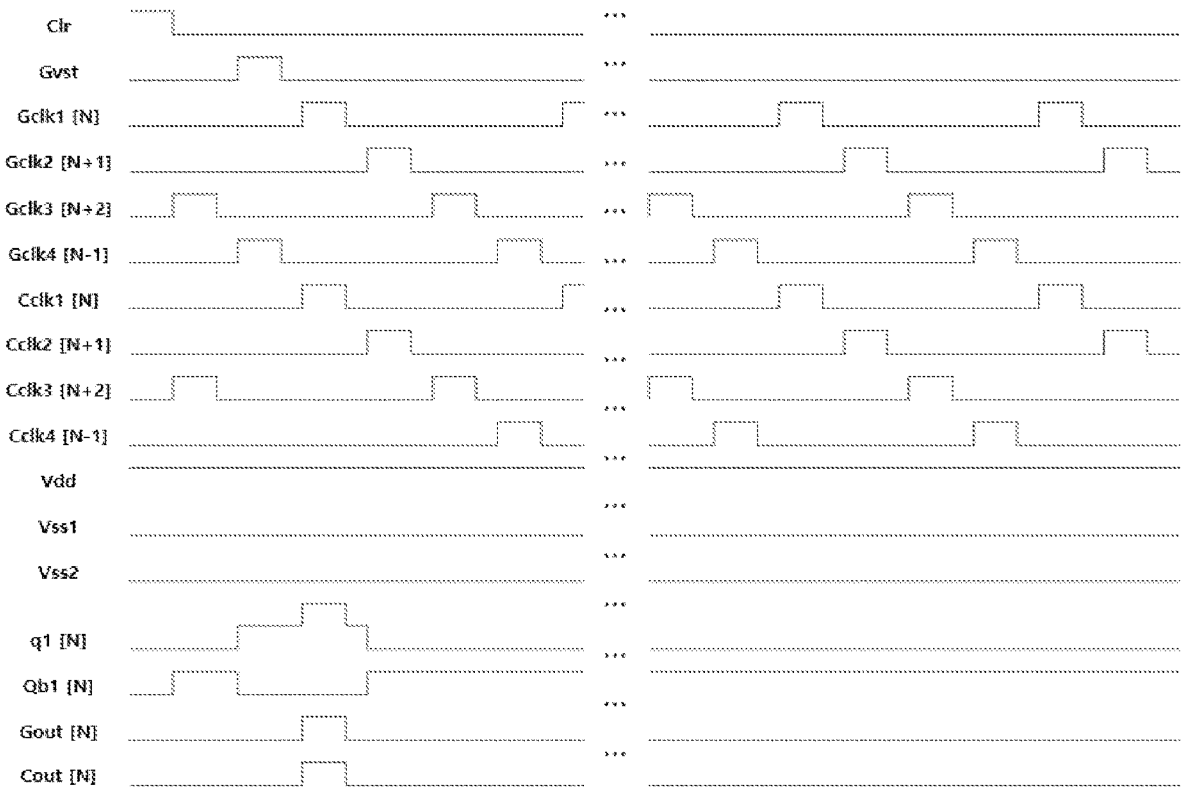
FIG. 15 is a diagram illustrating entire drive waveforms of scan signal generation units.
Figure 16:
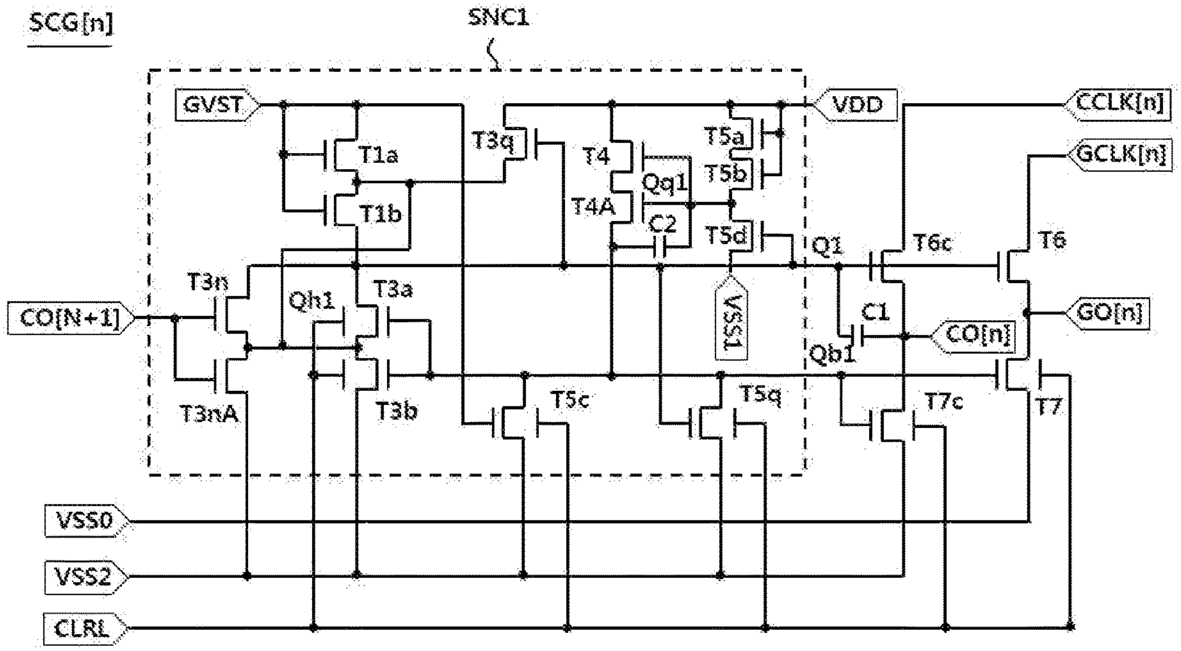
FIG. 16 is a circuit diagram illustrating an Nth scan signal generation unit according to a modified example of the second embodiment.
Figure 17:
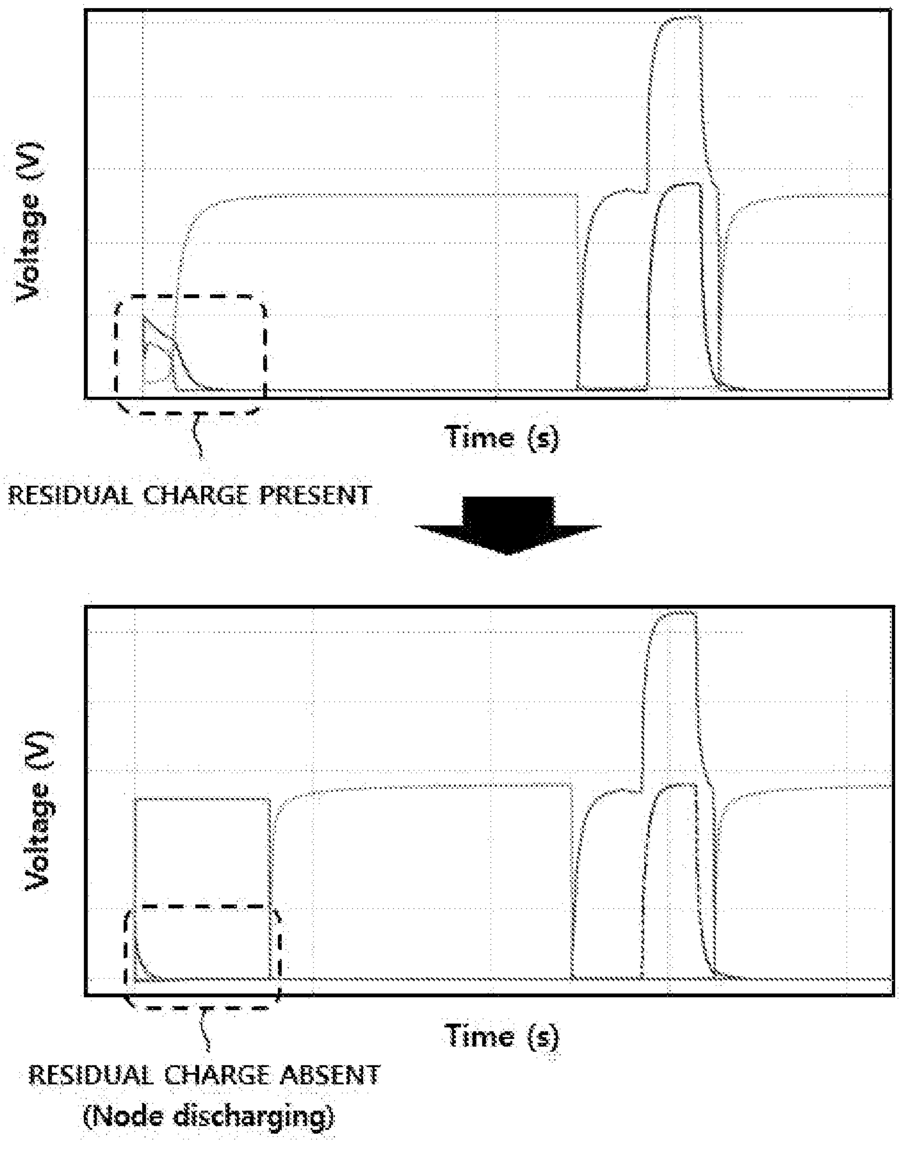
FIG. 17 is a simulation result illustrating initialization using the clear signal generated according to the second embodiment.

FIG. 13 is a circuit configuration diagram illustrating a circuit included in the Nth scan signal generation unit in more detail according to a second embodiment, FIG. 14 is a waveform diagram for describing an operation of the Nth scan signal generation unit for each section, FIG. 15 is a diagram illustrating entire drive waveforms of scan signal generation units, FIG. 16 is a circuit diagram illustrating the Nth scan signal generation unit according to a modified example of the second embodiment, and FIG. 17 is a simulation result illustrating initialization using a clear signal generated according to the second embodiment.

As illustrated in FIG. 13, the Nth scan signal generation unit SCG[n] may include a first scan node control circuit unit SNC1, first scan carry signal output units T6*c*, C1 and T7*c*, and first scan signal output units T6 and T7.

The first scan node control circuit unit SNC1 may include a 1-1th scan transistor T1*a*, a 1-2th scan transistor T1*b*, a 3-1th scan transistor T3*a*, a 3-2th scan transistor T3*b*, a 3-3th scan transistor T3*n*, a 3-4th scan transistor T3*n*A, a 3-5th scan transistor T3*q*, a 4-1th scan transistor T4, a 5-1th scan transistor T5*c*, and a 5-2th scan transistor T5*q*.

The 1-1th scan transistor Tla may have a first electrode and a gate electrode connected to the first start signal line GVST and a second electrode connected to a first electrode of the 1-2th scan transistor T1*b*. The 1-1th scan transistor T1*a* may operate based on the first start signal, and deliver the first start signal to the 1-2th scan transistor T1*b*.

The 1-2th scan transistor T1*b* may have a gate electrode connected to the first start signal line GVST, the first electrode connected to the second electrode of the 1-1th scan transistor T1*a* and a node Qh1, and a second electrode connected to a node Q1. The 1-2th scan transistor T1*b* may operate based on the first start signal, and control the node Q1 together with the 1-1th scan transistor T1*a*.

The 3-1th scan transistor T3*a* may have a gate electrode connected to a node Qb1, a first electrode connected to the node Q1, and a second electrode connected to a first electrode of the 3-2th scan transistor T3*b*. The 3-1th scan transistor T3*a* may operate based on a potential of the node Qb1, and deliver a potential of the node Q1 to the 3-2th scan transistor T3*b*.

The 3-2th scan transistor T3*b* may have a gate electrode connected to the node Qb1, the first electrode connected to the second electrode of the 3-1th scan transistor T3*a*, and a second electrode connected to the third low-voltage line VSS2. The 3-2th scan transistor T3*b* may operate based on a potential of the node Qb1, and control the node Q1 together with the 3-1th scan transistor T3*a*.

The 3-3th scan transistor T3*n* may have a gate electrode connected to an (N+1)th scan carry signal output terminal CO[N+1] of the (N+1)th scan signal generation unit, a first electrode connected to the node Q1, and a second electrode connected to a first electrode of the 3-4th scan transistor T3*n*A. The 3-3th scan transistor T3*n* may operate based on an (N+1)th scan carry signal output through the (N+1)th scan carry signal output terminal CO[N+1] of the (N+1)th scan signal generation unit, and may deliver a potential of the node Q1 to the 3-4th scan transistor T3*n*A.

The 3-4th scan transistor T3*n*A may have a gate electrode connected to the (N+1)th scan carry signal output terminal CO[N+1] of the (N+1)th scan signal generation unit, the first electrode connected to the second electrode of the 3-3th scan transistor T3*n* and the node Qh1, and a second electrode connected to the third low-voltage line VSS2. The 3-4th scan transistor T3*n*A may operate based on the (N+1)th scan carry signal output through the (N+1)th scan carry signal output terminal CO[N+1] of the (N+1)th scan signal generation unit, and may control the node Q1 and the node Qh1 together with the 3-3th scan transistor T3*n*.

The 3-5th scan transistor T3*q* may have a gate electrode connected to the node Q1, a first electrode connected to the first high-voltage line VDD, and a second electrode connected to the node Qh1. The 3-5th scan transistor T3*q* may operate based on a potential of the node Q1, and control the node Qh1 using the first high voltage.

The 4-1th scan transistor T4 may have a gate electrode and a first electrode connected to the first high-voltage line VDD, and a second electrode connected to the node Qb1. The 4-1th scan transistor T4 may operate based on the first high voltage and control the node Qb1.

The 5-1th scan transistor T5*c* may have a gate electrode connected to the first start signal line GVST, a first electrode connected to the node Qb1, and a second electrode connected to the third low-voltage line VSS2. The 5-1th scan transistor T5*c* may operate based on the first start signal and control the node Qb1 using the third low voltage.

The 5-2th scan transistor T5*q* may have a gate electrode connected to the node Q1, a first electrode connected to the node Qb1, and a second electrode connected to the third low-voltage line VSS2. The 5-2th scan transistor T5*q* may operate based on a potential of the node Q1 and control the node Qb1 using the third low voltage.

The first scan signal output units T6 and T7 may include a 1-1th scan pull-up transistor T6 and a 1-1th scan pull-down transistor T7. The first scan signal output units T6 and T7 may output the Nth scan signal through the Nth scan signal output terminal GO[n] according to potentials of the node Q1 and the node Qb1 that operate alternately.

The 1-1th scan pull-up transistor T6 may have a gate electrode connected to the node Q1, a first electrode connected to the Nth scan clock signal line GCLK[n], and a second electrode connected to the Nth scan signal output terminal GO[n] of the Nth scan signal generation unit SCG[n]. The 1-1th scan pull-up transistor T6 may operate based on a potential of the node Q1 and output a first scan clock signal as the Nth scan signal at a high voltage.

The 1-1th scan pull-down transistor T7 may have a gate electrode connected to the node Qb1, a first electrode connected to the Nth scan signal output terminal GO[n] of the Nth scan signal generation unit SCG[n], and a second electrode connected to the second low-voltage line VSS1. The 1-1th scan pull-down transistor T7 may operate based on a potential of the node Qb1 and output the second low voltage as the Nth scan signal at a low voltage.

The first scan carry signal output units T6*c*, C1, and T7*c* may include a 1-2th scan pull-up transistor T6*c*, a first capacitor C1, and a 1-2th scan pull-down transistor T7*c*. The first scan carry signal output units T6*c*, C1, and T7*c* may output the Nth scan carry signal through the Nth scan carry signal output terminal CO[n] according to potentials of the node Q1 and the node Qb1 that operate alternately.

The 1-2th scan pull-up transistor Toc may have a gate electrode connected to the node Q1, a first electrode connected to the Nth carry clock signal line CCLK[n], and a second electrode connected to the Nth scan carry signal output terminal CO[n] of the Nth scan signal generation unit SCG[n]. The 1-2th scan pull-up transistor T6*c* may operate based on a potential of the node Q1 and output the Nth carry clock signal as the Nth scan carry signal at a high voltage.

The 1-2th scan pull-down transistor T7*c* may have a gate electrode connected to the node Qb1, a first electrode connected to the Nth scan carry signal output terminal CO[n] of the Nth scan signal generation unit SCG[n], and a second electrode connected to the third low-voltage line VSS2. The 1-2th scan pull-down transistor T7*c* may operate based on a potential of the node Qb1 and output the third low-voltage as the Nth scan carry signal at a low voltage.

The 3-1th scan transistor T3*a*, the 3-2th scan transistor T3*b*, the 5-1th scan transistor T5*c*, the 5-2th scan transistor T5*q*, the 1-1th scan pull-down transistor T7, and the 1-2th scan pull-down transistor T7*c* included in the Nth scan signal generation unit SCG[n] may each include a back gate electrode connected to the clear signal line CLRL that delivers the clear signal.

The 3-1th scan transistor T3*a*, the 3-2th scan transistor T3*b*, the 5-1th scan transistor T5*c*, the 5-2th scan transistor T5*q*, the 1-1th scan pull-down transistor T7, and the 1-2th scan pull-down transistor T7*c* may be simultaneously turned on by the clear signal.

The Nth scan signal generation unit SCG[n] has the transistors each including the back gate electrode connected to the clear signal line CLRL, and thus may operate as follows.

As illustrated in a first time ① of FIGS. 13 and 14, in the Nth scan signal generation unit SCG[n], the node Q1, the node Qb1, the Nth scan carry signal output terminal CO[n], and the Nth scan signal output terminal GO[n] may be initialized by the clear signal Clr applied through the clear signal line CLRL.

An initialization operation of the node Q1, the node Qb1, the Nth scan carry signal output terminal CO[n], and the Nth scan signal output terminal GO[n] may be performed by a turn-on operation of the 3-1th scan transistor T3*a*, the 3-2th scan transistor T3*b*, the 5-1th scan transistor T5*c*, the 5-2th scan transistor T5*q*, the 1-1th scan pull-down transistor T7, and the 1-2th scan pull-down transistor T7*c* controlling each of the node Q1, the node Qb1, the Nth scan carry signal output terminal CO[n], and the Nth scan signal output terminal GO[n].

The node Q1, the node Qb1, and the Nth scan carry signal output terminal CO[n] may be initialized by being discharged based on the third low voltage, and the Nth scan signal output terminal GO[n] may be initialized by being discharged based on the second low voltage.

As illustrated in a second time ② of FIGS. 13 and 14, the node Q1 of the Nth scan signal generation unit SCG[n] may be precharged based on the first start signal Gvst applied through a first start signal line GVST (or an (N−1)th scan carry signal output through an (N−1)th scan carry signal output terminal of an (N−1)th scan signal generation unit). Accordingly, a potential q1 of the node Q1 of the Nth scan signal generation unit SCG[n] may be in a state capable of outputting a signal at a high voltage.

As illustrated in a third time ③ of FIGS. 13 and 14, the node Q1 may be bootstrapped based on the Nth scan clock signal Ge1*k* applied through the Nth scan clock signal line GCLK[n] and the Nth carry clock signal applied through the Nth carry clock signal line CCLK[n]. Accordingly, an Nth scan signal Gout and an Nth scan carry signal Cout may be output through the Nth scan signal output terminal GO[n] and the Nth scan carry signal output terminal CO[n] of the Nth scan signal generation unit SCG[n], respectively.

As illustrated in a fourth time ④ of FIGS. 13 and 14, based on an (N+1)th scan carry signal Cout[n+1] output through the (N+1)th scan carry signal output terminal of the (N+1)th scan signal generation unit, the node Q1 of the Nth scan signal generation unit SCG[n] may be discharged, and the node Qb1 thereof may be precharged. Accordingly, the node Qb1 of the Nth scan signal generation unit SCG[n] may be in a state capable of outputting a signal at a low voltage.

Meanwhile, scan signal generation units having a subordinate relationship such as the first scan signal generation unit SCG[1] of the first stage STG1 and the second scan signal generation unit SCG[2] of the second stage STG2 illustrated in FIG. 8 may operate based on at least one of scan clock signals Gclk1[N], Gclk2[N+1], Gclk3[N+2], or Gclk4[N−1], at least one of carry clock signals Cclk1[N], Cclk2[N+1], Cclk3[N+2], or Cclk4[N−1], and voltages Vdd, Vss1, and Vss2 illustrated in FIG. 15.

As illustrated in FIG. 16, the first scan node control circuit unit SNC1 of the Nth scan signal generation unit SCG[n] may further include a 4-2th scan transistor T4A, a second capacitor C2, a 5-3th scan transistor T5*a*, a 5-4th scan transistor T5*b*, and a 5-5th scan transistor T5*d*. The 4-2th scan transistor T4A, the second capacitor C2, the 5-3th scan transistor T5*a*, the 5-4th scan transistor T5*b*, and the 5-5th scan transistor T5*d* improve the ability to maintain output of the Nth scan signal at a low voltage by allowing the node Qb1 to be stably charged for a long time.

As the above transistors are further included, in the 4-1th scan transistor T4, the gate electrode may be connected to a node Qq1, the first electrode may be connected to the first high-voltage line VDD, and the second electrode may be connected to a first electrode of the 4-2th scan transistor T4A. The 4-1th scan transistor T4 may operate based on a potential of the node Qq1 and deliver the first high voltage to the 4-2th scan transistor T4A.

The 4-2th scan transistor T4A may have a gate electrode connected to the first electrode of the second capacitor C2 and the node Qq1, the first electrode connected to the second electrode of the 4-1th scan transistor T4, and a second electrode connected to the second electrode of the second capacitor C2 and the node Qb1. The 4-2th scan transistor T4A may operate based on a potential of the node Qq1 and control the node Qb1 together with the 4-1th scan transistor T4.

The 5-3th scan transistor T5*a* may have a gate electrode and a first electrode connected to the first high-voltage line VDD, and a second electrode connected to the 5-4th scan transistor T5*b*. The 5-3th scan transistor T5*a* may operate based on the first high voltage, and deliver the first high volage to the 5-4th scan transistor T5*b*.

The 5-4th scan transistor T5*b* may have a gate electrode connected to the first high-voltage line VDD, a first electrode connected to the second electrode of the 5-3th scan transistor T5*a*, and a second electrode connected to the node Qq1 and a first electrode of the 5-5th scan transistor T5*d*. The 5-4th scan transistor T5*b* may operate based on the first high voltage, and deliver the first high voltage to the node Qq1 together with the 5-3th scan transistor T5*a*.

The 5-5th scan transistor T5*d* may have a gate electrode connected to the node Q1, the first electrode connected to the node Qq1, and a second electrode connected to the second low-voltage line VSS1. The 5-5th scan transistor T5*d* may operate based on a potential of the node Q1, and control the node Qq1 using the second low voltage.

As illustrated in FIG. 17, when the gate driver is implemented according to the second embodiment, it is possible to perform node discharging that can easily remove and initialize residual charges differently present in the nodes of the scan signal generation unit. In addition, node discharging (node initialization) may be simultaneously performed over all stages at least once in one frame during operation of the gate driver. Accordingly, residual charges that are present differently across all stages may be simultaneously removed and initialized. In FIG. 17, RESIDUAL CHARGE PRESENT means current remains in the node, and RESIDUAL CHARGE ABSENT means current does not remain in the node.

Figure 18:
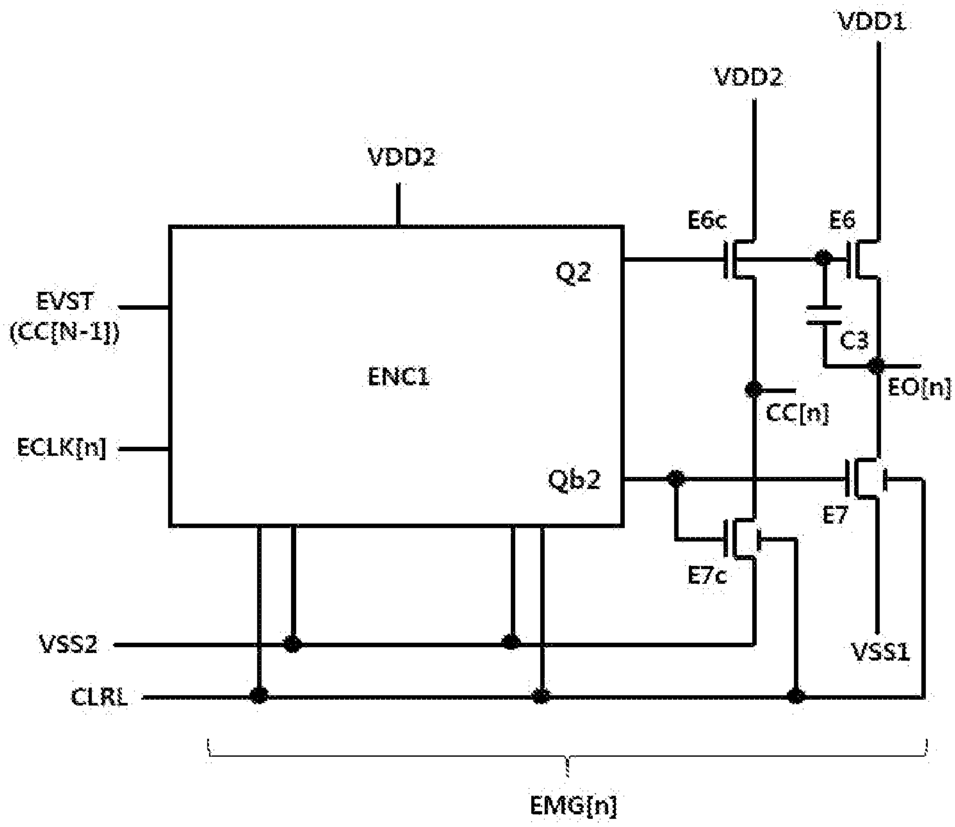
FIG. 18 is a circuit configuration diagram illustrating an Nth light-emitting signal generation unit according to a third embodiment.
Figure 19:
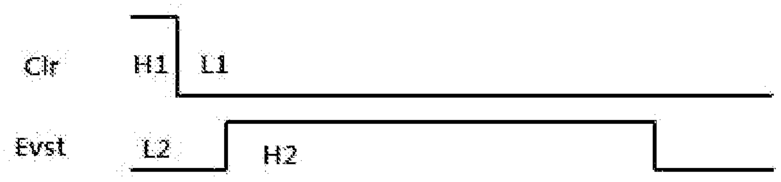
FIG. 19 is a diagram illustrating a part of a drive waveform of the Nth light-emitting signal generation unit according to the third embodiment.
Figure 20:
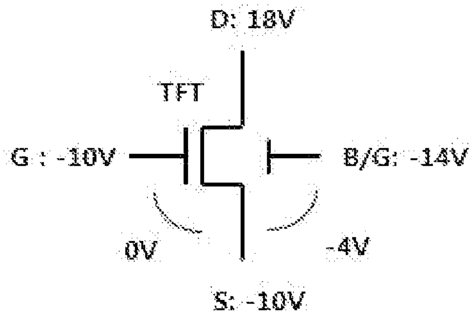
FIG. 20 is a drawing for describing advantages according to application of the clear signal.

FIG. 18 is a circuit configuration diagram illustrating an Nth light-emitting signal generation unit according to a third embodiment, FIG. 19 is a diagram illustrating a part of a drive waveform of the Nth light-emitting signal generation unit according to the third embodiment, and FIG. 20 is a drawing for describing advantages according to application of the clear signal.

As illustrated in FIG. 18, an Nth light-emitting signal generation unit EMG[n] may include a first light-emitting node control circuit unit ENC1, first light-emitting carry signal output units E6*c* and E7*c*, and first light-emitting signal output units E6, C3, and E7.

The first light-emitting node control circuit unit ENC1 may operate based on various signals, voltages, etc., applied through the third high-voltage line VDD2, the third low-voltage line VSS2, and the second start signal line EVST, and control charging and discharging of a node Q2 and a node Qb2. The node Q2 and the node Qb2 of the first light-emitting node control circuit unit ENC1 may be controlled by the second start signal applied through the second start signal line EVST and an Nth light-emitting clock signal applied through an Nth light-emitting clock signal line ECLK[n].

Meanwhile, FIG. 18 illustrates that the second start signal line EVST is connected to the Nth light-emitting signal generation unit EMG[n] as an example. However, the second start signal line EVST may be applied to a light-emitting signal generation unit located in the first stage, and each of light-emitting signal generation units located in remaining stages may receive input of a light-emitting carry signal of a previous stage as the second start signal.

The first light-emitting signal output units E6, C3, and E7 may include a 1-1th control pull-up transistor E6, a third capacitor C3, and a 1-1th control pull-down transistor E7. The first light-emitting signal output units E6, C3, and E7 may output an Nth light-emitting signal through an Nth light-emitting signal output terminal EO[n] according to potentials of the node Q2 and the node Qb2 that operate alternately.

When the 1-1th control pull-up transistor E6 is turned on by the potential of the node Q2, bootstrapping by the second capacitor C2 occurs, and the Nth light-emitting signal at a high voltage may be output based on the second high voltage applied through the second high-voltage line VDD1. When the 1-1th control pull-down transistor E7 is turned on by the potential of the node Qb2, the Nth light-emitting signal at a low voltage may be output based on the second low voltage applied through the second low-voltage line VSS2.

The first light-emitting carry signal output units E6*c* and E7*c* may include a 1-2th control pull-up transistor E6*c* and a 1-2th control pull-down transistor E7*c*. The first light-emitting carry signal output units E6*c* and E7*c* may output an Nth light-emitting carry signal through an Nth light-emitting carry signal output terminal CC[n] according to potentials of the node Q2 and the node Qb2 that operate alternately.

When the 1-2th control pull-up transistor E6*c* is turned on by the potential of the node Q2, the Nth light-emitting carry signal at a high voltage may be output based on a third high voltage applied through the third high-voltage line VDD2. When the 1-2th control pull-down transistor E7c is turned on by the potential of the node Qb2, the Nth light-emitting carry signal at a low voltage may be output based on the third low voltage applied through the third low-voltage line VSS2.

The 1-1th control pull-down transistor E7 included in the first light-emitting signal output units E6, C3, and E7 and the 1-2th control pull-down transistor E7c included in the first light-emitting carry signal output units E6c and E7c may each include a back gate electrode. The back gate electrode of the 1-1th control pull-down transistor E7 and the back gate electrode of the 1-2th control pull-down transistor E7c may be connected to the clear signal line CLRL that delivers the clear signal. In addition, at least one of transistors controlling the node Q2 and the node Qb2 of the first light-emitting node control circuit unit ENC1 may include a back gate electrode, and may be connected to the clear signal line CLRL that delivers the clear signal.

As illustrated in FIGS. 18 and 19, the clear signal Clr delivered through the clear signal line CLRL may be generated as a first high voltage H1 upon beginning of driving prior to the second start signal Evst delivered through the second start signal line EVST, and then may be maintained as a first low voltage L1.

When the clear signal Clr is applied upon beginning of driving prior to the second start signal Evst, it is possible to initialize transistors that control the node Q2 and the node Qb2 of the 1-1th control pull-down transistor E7, the 1-2th control pull-down transistor E7c, and the first light-emitting node control circuit unit ENC1 (node discharge). Since the light-emitting signal generation units may attempt discharge of charges remaining inside due to the initialization operation of the nodes, driving stability and driving reliability may be improved.

Meanwhile, at least one of a first high voltage H1 or a first low voltage L1 constituting the clear signal Clr may have a different level compared to a second high voltage H2 and a second low voltage L2 constituting the second start signal Evst. Hereinafter, a description will be given of an example in which a level of the first low voltage L1 constituting the clear signal Clr is a negative voltage level lower than a level of the second low voltage L2 constituting the second start signal Evst.

As illustrated in FIG. 20, in the TFT, a voltage of −10 V may be applied to a gate electrode G, a voltage of 18 V may be applied to a drain electrode D, a voltage of −10 V may be applied to a source electrode S, and a voltage of −14 V may be applied to a back gate electrode B/G. In this case, a gate-source voltage difference becomes 0 V, and a back gate-source voltage difference may be −4 V.

In this way, when a negative voltage lower than a negative voltage applied to the source electrode S of the TFT is applied to the back gate electrode B/G, a threshold voltage Vth may be moved, and thus there is an effect of ensuring an off margin of a gate-source voltage Vgs, which can be seen by referring to a simulation result diagram related to movement of the threshold voltage according to voltages (+, −) applied to the back gate electrode B/G of FIG. 12.

In addition, when a negative voltage lower than a negative voltage applied to the source electrode S of the TFT is applied to the back gate electrode B/G, generation of leakage current may be minimized or reduced. When the TFT is implemented based on oxide, a satisfactory effect may be obtained.

In the third embodiment, in order to maximize or increase the effect of moving the threshold voltage Vth of the TFT as described with reference to FIG. 12, etc., the clear signal Clr applied to the back gate electrode B/G may be configured in an alternating current form. Further, the negative voltage level constituting the clear signal Clr may be varied at least every frame.

Note that a scheme of configuring the clear signal Clr applied to the back gate electrode B/G in the alternating current form, and varying the clear signal Clr to maximize or increase the effect of moving the threshold voltage Vth of the TFT may be applied to various forms of light-emitting signal generation units. Hereinafter, a fourth embodiment for aiding in understanding of the third embodiment will be described based on an example of a circuit included in the first light-emitting node control circuit unit ENC1 of the Nth light-emitting signal generation unit EMG[n].

Figure 21:
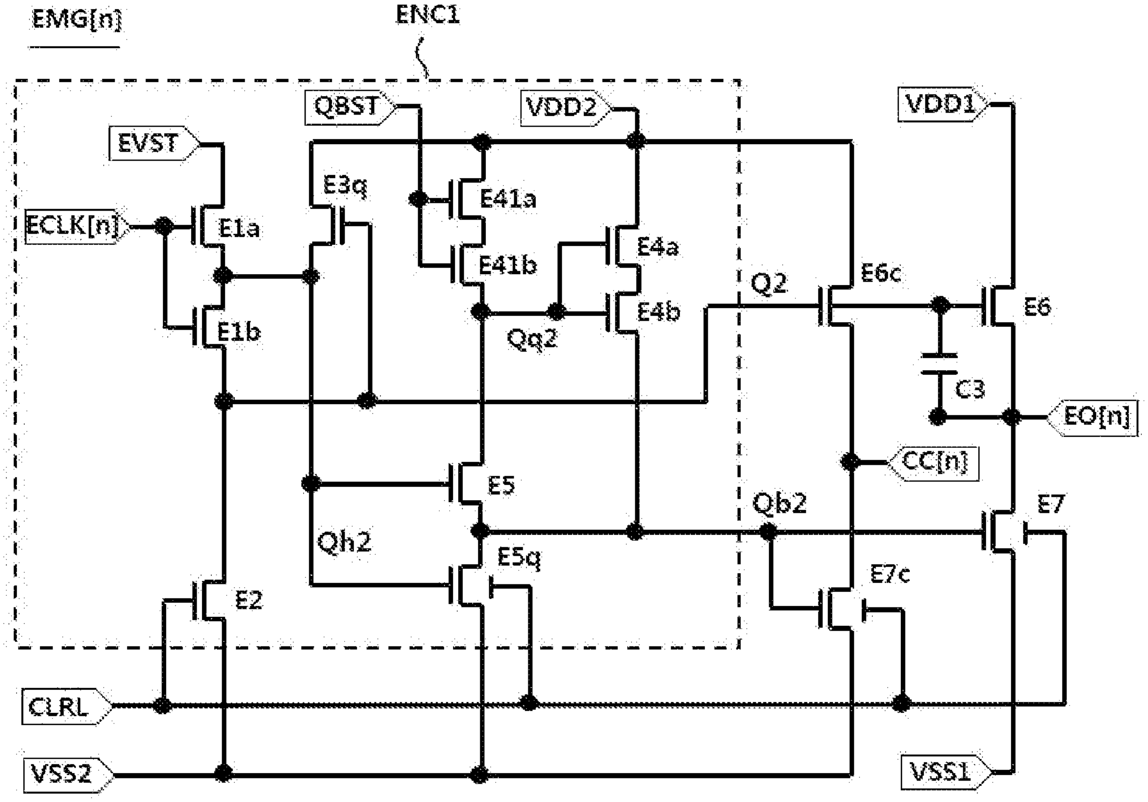
FIG. 21 is a circuit configuration diagram illustrating a circuit included in the Nth light-emitting signal generation unit in more detail according to a fourth embodiment.
Figure 22:
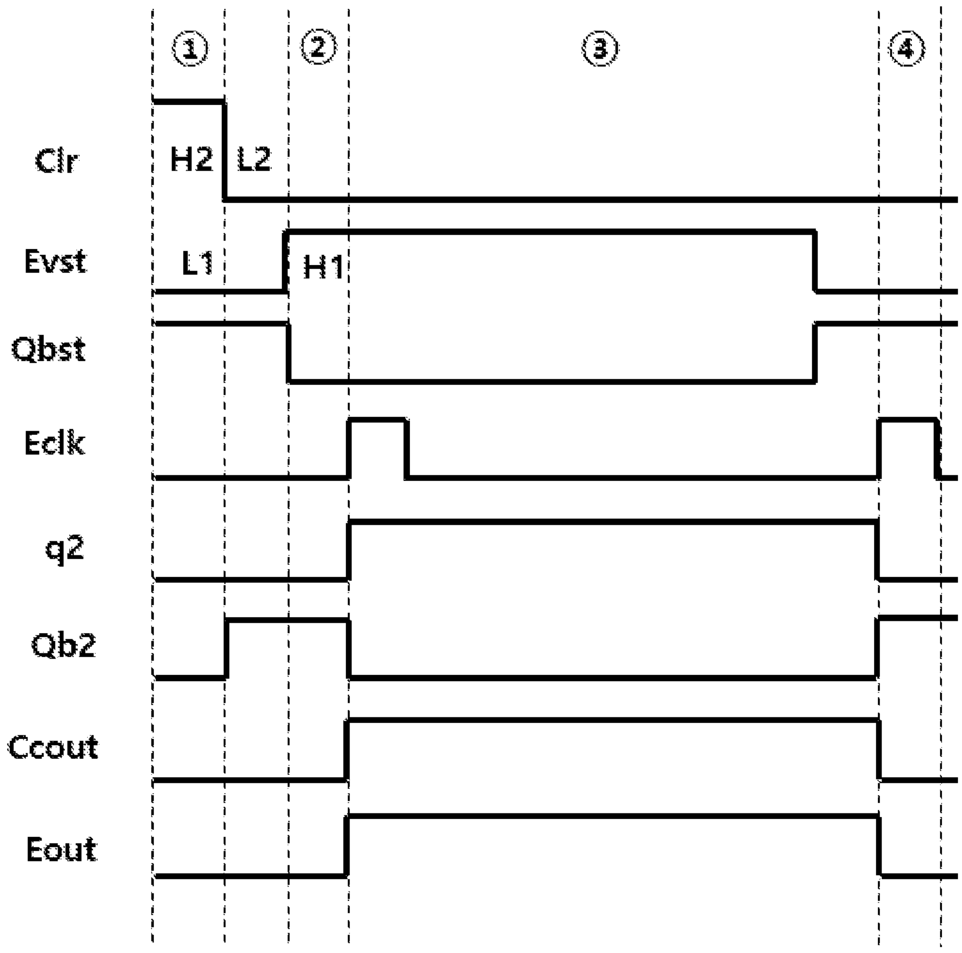
FIG. 22 is a waveform diagram for describing an operation of the Nth light-emitting signal generation unit for each section.
Figure 23:
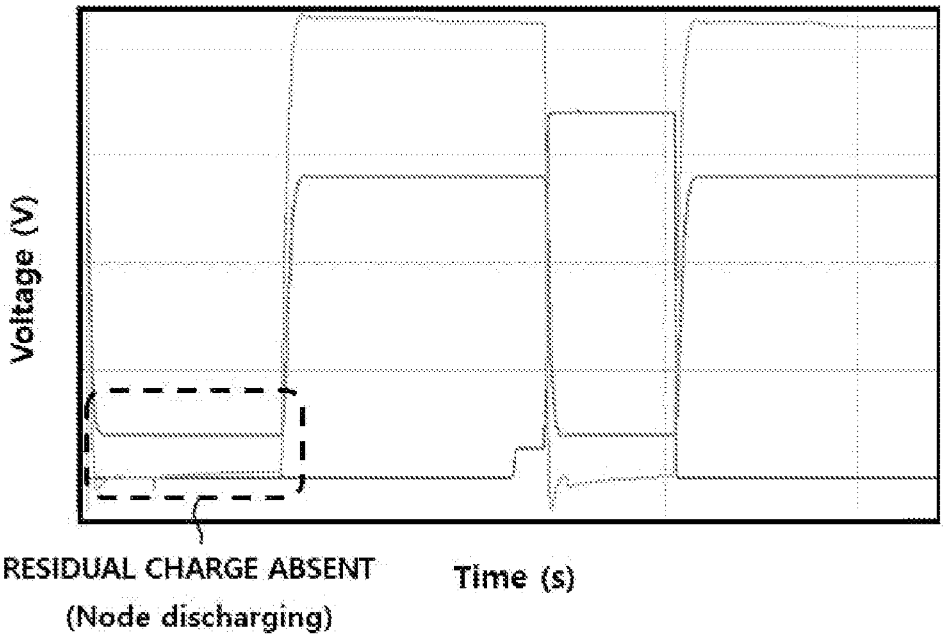
FIG. 23 is a simulation result illustrating initialization using a clear signal generated according to the fourth embodiment.

FIG. 21 is a circuit configuration diagram illustrating a circuit included in the Nth light-emitting signal generation unit in more detail according to the fourth embodiment, FIG. 22 is a waveform diagram for describing an operation of the Nth light-emitting signal generation unit for each section, and FIG. 23 is a simulation result illustrating initialization using a clear signal generated according to the fourth embodiment.

As illustrated in FIG. 21, the Nth light-emitting signal generation unit EMG[n] may include a first light-emitting node control circuit unit ENC1, first light-emitting carry signal output units E6c and E7c, and first light-emitting signal output units E6, C3, and E7.

The first light-emitting node control circuit unit ENC1 may include a 1-1th control transistor E1a, a 1-2th control transistor E1b, a 2-1th control transistor E2, a 3-1th control transistor E3q, a 4-1th control transistor E4a, a 4-2th control transistor E4b, a 4-3th control transistor E41a, a 4-4th control transistor E41b, a 5-1th control transistor E5, and a 5-2th control transistor E5q.

The 1-1th control transistor Ela may have a gate electrode connected to an Nth control clock signal line ECLK[n], a first electrode connected to the second start signal line EVST, and a second electrode connected to a node Qh2. The 1-1th control transistor E1a may operate based on an Nth control clock signal, and deliver the second start signal to the node Qh2.

The 1-2th control transistor E1b may have a gate electrode connected to the Nth control clock signal line ECLK [n], a first electrode connected to the node Qh2, and a second electrode connected to the node Q2. The 1-2th control transistor E1b may operate based on the Nth control clock signal, and control the node Q2.

The 2-1th control transistor E2 may have a gate electrode connected to the clear signal line CLRL, a first electrode connected to the node Q2, and a second electrode connected to the third low-voltage line VSS2. The 2-1th control transistor E2 may operate based on the clear signal, and control the node Q2 using the third low voltage.

The 3-1th control transistor E3q may have a gate electrode connected to the node Q2, a first electrode connected to the third high-voltage line VDD2, and a second electrode connected to the node Qh2. The 3-1th control transistor E3q may operate based on a potential of the node Q2, and deliver the third high voltage to the node Qh2.

The 4-1th control transistor E4a may have a gate electrode connected to a node Qq2, a first electrode connected to the third high-voltage line VDD2, and a second electrode connected to a first electrode of the 4-2th control transistor E4b. The 4-1th control transistor E4a may operate based on a potential of the node Qq2, and deliver the third high voltage to the 4-2th control transistor E4b.

The 4-2th control transistor E4*b* may have a gate electrode connected to the node Qq2, the first electrode connected to the second electrode of the 4-1th control transistor E4*a*, and a second electrode connected to the node Qb2. The 4-2th control transistor E4*b* may operate based on a potential of the node Qq2, and control the node Qb2 using the third high voltage together with the 4-1th control transistor E4*a*.

The 4-3th control transistor E41*a* may have a gate electrode connected to a node QBST, a first electrode connected to the third high-voltage line VDD2, and a second electrode connected to a first electrode of the 4-4th control transistor E41*b*. The 4-3th control transistor E41*a* may operate based on a potential of the node QBST, and deliver the third high voltage to the 4-4th control transistor E41*b*. Meanwhile, the node QBST may be a node Qb2 of an (N−1)th light-emitting signal generation unit or an (N+1)th light-emitting signal generation unit.

The 4-4th control transistor E41*b* may have a gate electrode connected to the node QBST, the first electrode connected to the second electrode of the 4-3th control transistor E41*a*, and a second electrode connected to the node Qq2. The 4-4th control transistor E41*b* may operate based on a potential of the node QBST, and deliver the third high voltage to the node Qq2.

The 5-1th control transistor E5 may have a gate electrode connected to the node Qh2, a first electrode connected to the node Qq2, and a second electrode connected to a first electrode of the 5-2th control transistor E5*q* and the node Qb2. The 5-1th control transistor E5 may operate based on a potential of the node Qh2, and control the node Qb2 using a potential of the node Qq2.

The 5-2th control transistor E5*q* may have a gate electrode connected to the node Qh2, the first electrode connected to the second electrode of the 5-1th control transistor E5 and the node Qb2, and a second electrode connected to the third low-voltage line VSS2. The 5-2th control transistor E5*q* may operate based on a potential of the node Qh2, and control the node Qb2 using the third low voltage.

The first light-emitting signal output units E6, C3, and E7 may include a 1-1th control pull-up transistor E6, a third capacitor C3, and a 1-1th control pull-down transistor E7. The first light-emitting signal output units E6, C3, and E7 may output the Nth light-emitting signal through the Nth light-emitting signal output terminal EO[n] according to potentials of the node Q2 and the node Qb2 that operate alternately.

The 1-1th control pull-up transistor E6 may have a gate electrode connected to the node Q2 and the first electrode of the second capacitor C2, a first electrode connected to the second high-voltage line VDD1, and a second electrode connected to the Nth light-emitting signal output terminal EO[n] of the Nth light-emitting signal generation unit EMG [n]. The 1-1th control pull-up transistor E6 may operate based on a potential of the node Q2, and output the second high voltage as the Nth light-emitting signal at a high voltage.

The 1-1th control pull-down transistor E7 may have a gate electrode connected to the node Qb2, a first electrode connected to the Nth light-emitting signal output terminal EO[n] of the Nth light-emitting signal generation unit EMG [n], and a second electrode connected to the second low-voltage line VSS1. The 1-1th control pull-down transistor E7 may operate based on a potential of the node Qb2 and output the second low voltage as the Nth light-emitting signal at a low voltage.

The first light-emitting carry signal output units E6*c* and E7*c* may include a 1-2th control pull-up transistor E6*c* and a 1-2th control pull-down transistor E7*c*. The first light-emitting carry signal output units E6*c* and E7*c* may output the Nth light-emitting carry signal through the Nth light-emitting carry signal output terminal CC[n] according to potentials of the node Q2 and the node Qb2 that operate alternately.

The 1-2th control pull-up transistor E6*c* may have a gate electrode connected to the node Q2, a first electrode connected to the third high-voltage line VDD2, and a second electrode connected to the Nth light-emitting carry signal output terminal CC[n] of the Nth light-emitting signal generation unit EMG[n]. The 1-2th control pull-up transistor E6*c* may operate based on a potential of the node Q2 and output the third high voltage as the Nth light-emitting carry signal at a high voltage.

The 1-2th control pull-down transistor E7*c* may have a gate electrode connected to the node Qb2, a first electrode connected to the Nth light-emitting carry signal output terminal CC[n] of the Nth light-emitting signal generation unit EMG[n], and a second electrode connected to the third low-voltage line VSS2. The 1-2th control pull-down transistor E7*c* may operate based on a potential of the node Qb2 and output the third low-voltage as the Nth light-emitting carry signal at a low voltage.

The 5-2th control transistor E5*q*, the 1-1th control pull-down transistor E7, and the 1-2th control pull-down transistor E7*c* included in the Nth light-emitting signal generation unit EMG[n] may each include a back gate electrode connected to the clear signal line CLRL that delivers the clear signal. The 5-2th control transistor E5*q*, the 1-1th control pull-down transistor E7, and the 1-2th control pull-down transistor E7*c* may be simultaneously turned on by the clear signal.

The Nth light-emitting signal generation unit EMG[n] has the transistors each including the back gate electrode connected to the clear signal line CLRL, and thus may operate as follows.

As illustrated in a first time ① of FIGS. 21 and 22, in the Nth light-emitting signal generation unit EMG[n], the node Q2, the node Qb2, the Nth light-emitting carry signal output terminal CC[n], and the Nth light-emitting signal output terminal EO[n] may be initialized by the clear signal Clr applied through the clear signal line CLRL.

An initialization operation of the node Q2, the node Qb2, the Nth light-emitting carry signal output terminal CC[n], and the Nth light-emitting signal output terminal EO[n] may be performed by a turn-on operation of the 2-1th control transistor E2, the 5-2th control transistor E5*q*, the 1-1th control pull-down transistor E7, and the 1-2th control pull-down transistor E7*c* controlling each of the node Q2, the node Qb2, the Nth light-emitting carry signal output terminal CC[n], and the Nth light-emitting signal output terminal EO[n].

The node Q2, the node Qb2, and the Nth light-emitting carry signal output terminal CC[n] may be initialized by being discharged based on the third low voltage, and the Nth light-emitting signal output terminal EO[n] may be initialized by being discharged based on the second low voltage.

As illustrated in a second time ② of FIGS. 21 and 22, the node Q2 of the Nth light-emitting signal generation unit EMG[n] may be precharged based on the second start signal Evst applied through a second start signal line EVST (or an (N−1)th light-emitting carry signal output through an (N−1)th light-emitting carry signal output terminal of the (N−1)th light-emitting signal generation unit). Accordingly, a potential q2 of the node Q2 of the Nth light-emitting signal generation unit EMG[n] may be in a state capable of outputting a signal at a high voltage.

As illustrated in a third time ③ of FIGS. 21 and 22, an Nth light-emitting signal Eout and an Nth light-emitting carry signal Ccout may be output through the Nth light-emitting signal output terminal EO[n] and the Nth light-emitting carry signal output terminal CC[n] of the Nth light-emitting signal generation unit EMG[n], respectively.

As illustrated in a fourth time ④ of FIGS. 21 and 22, the node Qb2 may be precharged based on a potential Qbst of the node QBST. Accordingly, the node Qb2 of the Nth light-emitting signal generation unit EMG[n] may be in a state capable of outputting a signal at a low voltage.

As illustrated in FIG. 23, when the gate driver is implemented according to the fourth embodiment, it is possible to perform node discharging that can easily remove and initialize residual charges differently present in the nodes of the light-emitting signal generation unit. In addition, node discharging (node initialization) may be simultaneously performed over all stages at least once in one frame during operation of a gate signal generation circuit. Accordingly, residual charges that are present differently across all stages may be simultaneously removed and initialized. In FIG. 23, RESIDUAL CHARGE ABSENT means current does not remain in the node.

Figure 24:
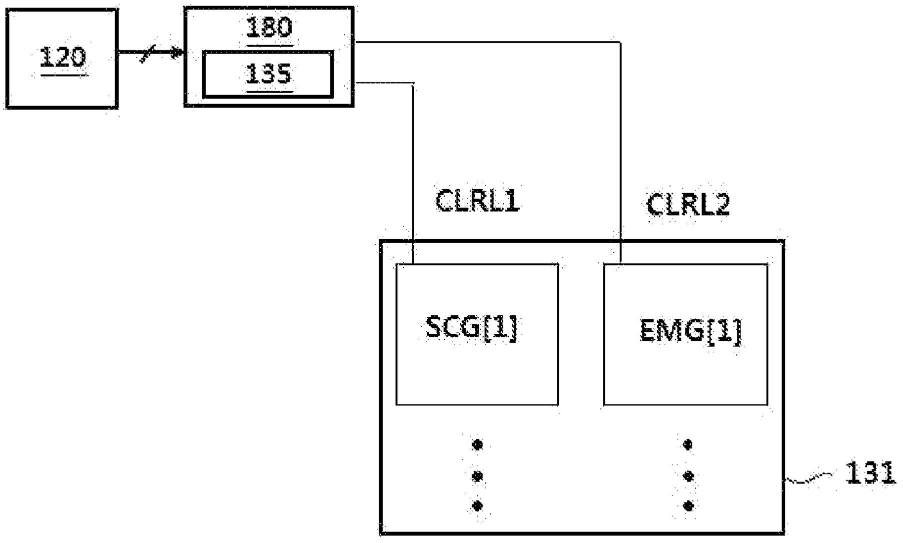
FIGS. 24 and 25 are diagrams for describing a method of controlling the gate driver according to a fifth embodiment.
Figure 25:
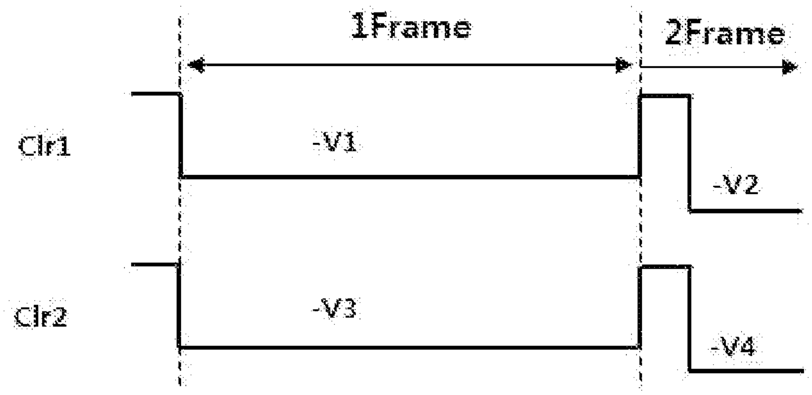

FIGS. 24 and 25 are diagrams for describing a method of controlling the gate driver according to a fifth embodiment.

As illustrated in FIGS. 24 and 25, the shift register 131 of the gate driver may include scan signal generation units (SCG[1], etc.) and light-emitting signal generation units (EMG[1], etc.). The scan signal generation units (SCG[1], etc.) and the light-emitting signal generation units (EMG[1], etc.) may be connected to a first clear signal line CLRL1 and a second clear signal line CLRL2 provided separately from each other.

The first clear signal line CLRL1 and the second clear signal line CLRL2 are connected to the power supply 180 or the level shifter 135 provided inside or outside the power supply 180, and may deliver a first clear signal Clr1 or a second clear signal Clr2 prepared from one of the clear signal lines. The first clear signal Clr1 and the second clear signal Clr2 may have the same or different voltage levels constituting a low voltage. For example, in a first frame 1Frame, a voltage level −V1 of the first clear signal Clr1 and a voltage level −V3 of the second clear signal Clr2 may be the same. However, a voltage level −V2 of the first clear signal Clr1 and a voltage level −V4 of the second clear signal Clr2 may be different in a subsequent second frame (2Frame).

The timing controller 120 may perform a control operation so that low-voltage levels of the first clear signal Clr1 and the second clear signal Clr2 are different at least every frame based on driving information indicating that driving conditions of the scan signal generation units (SCG[1], etc.) and the light-emitting signal generation units (EMG[1], etc.) are different and deterioration information corresponding to an input data signal. As a result, the LED device may improve driving reliability and driving stability as well as lifespan.

As described above, the present embodiment has an effect of improving the lifespan as well as driving reliability and driving stability of the display device based on a circuit capable of simultaneously removing and initializing residual charges that are present differently for each stage and each node of the signal generation unit. In addition, the present embodiment has an effect of minimizing generation of leakage current during driving of the device by varying the negative voltage level of the signal used for initialization at least every frame.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel configured to display an image;

a data driver configured to supply a data voltage to the display panel;

a gate driver including a scan signal generation circuit configured to supply a scan signal to the display panel and a light-emitting signal generation circuit configured to supply a light-emitting signal to the display panel;

a start signal line configured to deliver a start signal to the gate driver;

a low-voltage line configured to supply a low-voltage power to the gate driver; and a clear signal line coupled to the gate driver and configured to deliver a clear signal in an alternating current form including a positive voltage level and a negative voltage level, wherein the negative voltage level of the clear signal is lower than a negative voltage level of the start signal and a negative voltage level of the low-voltage power, and wherein the clear signal is configured to initialize the gate driver before the start signal is applied by discharging at least one node of nodes of the scan signal generation circuit and at least one node of nodes of the light-emitting signal generation circuit, wherein the clear signal line includes a first clear signal line transmitting a first clear signal and a second clear signal line transmitting a second clear signal, the first clear signal line connected to a back gate electrode of a first signal transistor included in the scan signal generation circuit and the second clear signal line connected to a back gate electrode of a second signal transistor included in the light-emitting signal generation circuit, and wherein a negative voltage level of the first clear signal and a negative voltage level of the second clear signal are changed to have different levels in at least one frame while maintaining the negative voltage.

2. The display device according to claim 1, wherein the nodes of the scan signal generation circuit include a node Q and a node Qb configured to control the scan signal, and the nodes of the light-emitting signal generation circuit include a node Q and a node Qb configured to control the light-emitting signal.

3. The display device according to claim 1, wherein the negative voltage level of the clear signal is varied at least every frame.

4. The display device according to claim 1, wherein the gate driver is configured to perform initialization based on the clear signal before the start signal is applied.

5. The display device according to claim 1, wherein the low-voltage line is coupled to a power supply and is configured to receive a low-potential voltage.

6. The display device according to claim 1, wherein the clear signal line is coupled to a first back gate electrode included in a first transistor configured to control the at least one node and a second back gate electrode included in a second transistor configured to receive a potential of the at least one node.

7. The display device according to claim 1, wherein the low-voltage power is applied to a source electrode of each of a plurality of transistors and the clear signal is applied to a back gate electrode of each of the plurality of transistors.

8. The display device according to claim 1, wherein the clear signal line comprises:

the first clear signal line connected to a first back gate electrode included in a first transistor for controlling one or more nodes of the at least one node, a second back gate electrode included in a second transistor for controlling a scan signal output terminal that outputs a scan signal, and a third back gate electrode included in a third transistor for controlling a scan carry signal output terminal that outputs a scan carry signal in the scan signal generation circuit; and the second clear signal line connected to a fourth back gate electrode included in a fourth transistor for controlling another node other than the one or more nodes of the at least one node, a fifth back gate electrode included in a fifth transistor for controlling a light-emitting signal output terminal that outputs the light-emitting signal, and a sixth back gate electrode included in a sixth transistor for controlling a light-emitting carry signal output terminal that outputs a light-emitting carry signal in the light-emitting signal generation circuit.

9. The display device according to claim 8, wherein a voltage level of the first clear signal and a voltage level of the second clear signal are the same during a first time and different during a second time.

10. The display device according to claim 1, wherein the gate driver is initialized simultaneously in all stages thereof, each of the stages including the scan signal generation circuit and the light-emitting signal generation circuit.

11. A gate driving circuit comprising:

a scan signal generation circuit including a scan node control circuit configured to alternately control potentials of a node Q1 and a node Qb1, a scan signal output circuit configured to output a scan signal in response to the potentials of the node Q1 and the node Qb1, a scan carry signal output circuit configured to output a scan carry signal in response to the potentials of the node Q1 and the node Qb1, and a plurality of scan signal generation transistors;

a light-emitting signal generation circuit including a light-emitting node control circuit configured to alternately control potentials of a node Q2 and a node Qb2, a light-emitting signal output circuit configured to output a light-emitting signal in response to the potentials of the node Q2 and the node Qb2, a light-emitting carry signal output circuit configured to output a light-emitting carry signal in response to the potentials of the node Q2 and the node Qb2, and a plurality of light-emitting signal generation transistors, the scan signal generation circuit being separate and distinct from the light-emitting signal generation circuit; and a clear signal line is coupled and configured to deliver a clear signal, including a positive voltage level and a negative voltage level, to back gate electrodes included in one or more of the plurality of scan signal generation transistors and to back gate electrodes included in one or more of the plurality of light-emitting signal generation transistors, wherein the negative voltage level of the clear signal is lower than gate electrode voltages and source electrode voltages configured to be delivered to the scan signal generation transistors and the light-emitting signal generation transistors, wherein at least one of the scan signal generation circuit and the light-emitting signal generation circuit is configured to be initialized based on the clear signal before a start signal is applied, wherein the clear signal line includes a first clear signal line transmitting a first clear signal and a second clear signal line transmitting a second clear signal, the first clear signal line connected to a back gate electrode of a first signal transistor included in the scan signal generation circuit and the second clear signal line connected to a back gate electrode of a second signal transistor included in the light-emitting signal generation circuit, and wherein a negative voltage level of the first clear signal and a negative voltage level of the second clear signal are changed to have different levels in at least one frame while maintaining the negative voltage.

12. The gate driving circuit according to claim 11, wherein the negative voltage level of the clear signal is varied at least every frame.

13. The gate driving circuit according to claim 11, wherein the clear signal line is connected to a first back gate electrode included in a first transistor for controlling a node and a second back gate electrode included in a second transistor for generating output in response to a potential of the node, the node being included in the at least one of the scan signal generation circuit and the light-emitting signal generation circuit.

14. The gate driving circuit according to claim 13, wherein the negative voltage level of the clear signal is lower than a negative voltage level applied to respective source electrodes of the first and second transistors.

15. The gate driving circuit according to claim 11, wherein the clear signal line comprises:

the first clear signal line connected to a first back gate electrode of a first transistor included in the scan node control circuit, a second back gate electrode of a second transistor included in the scan signal output circuit, and a third back gate electrode of a third transistor included in the scan carry signal output circuit; and the second clear signal line connected to a fourth back gate electrode of a fourth transistor included in the light-emitting node control circuit, a fifth back gate electrode of a fifth transistor included in the light-emitting signal output circuit, and a sixth back gate electrode of a sixth transistor included in the light-emitting carry signal output circuit.

16. The gate driving circuit according to claim 15, wherein a voltage level of the first clear signal and a voltage level of the second clear signal are the same during a first time and different during a second time.

17. The gate driving circuit according to claim 11, wherein the scan signal generation circuit and the light-emitting signal generation circuit are initialized simultaneously.

18. The gate driving circuit according to claim 11, wherein the negative voltage level of the clear signal is lower than a negative voltage level of the start signal.

* * * * *